United States Patent
Lohmar et al.

(10) Patent No.: US 10,904,313 B2
(45) Date of Patent: Jan. 26, 2021

(54) APPARATUSES, METHODS, COMPUTER PROGRAMS, AND COMPUTER PROGRAM PRODUCTS FOR LIVE UPLINK ADAPTIVE STREAMING

(71) Applicant: TELEFONAKTIEBOLAGET LM ERICSSON (PUBL), Stockholm (SE)

(72) Inventors: Thorsten Lohmar, Aachen (DE); Ali El Essaili, Aachen (DE); Mohamed Ibrahim, Aachen (DE); Raphael Wagner, Neuss (DE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 68 days.

(21) Appl. No.: 16/217,586

(22) Filed: Dec. 12, 2018

(65) Prior Publication Data

US 2019/0173935 A1    Jun. 6, 2019

Related U.S. Application Data

(63) Continuation-in-part of application No. PCT/EP2018/065381, filed on Jun. 11, 2018.

(60) Provisional application No. 62/522,422, filed on Jun. 20, 2017, provisional application No. 62/623,779, filed on Jan. 30, 2018.

(51) Int. Cl.
*H04L 29/08*     (2006.01)
*H04L 29/06*     (2006.01)
(Continued)

(52) U.S. Cl.
CPC .......... *H04L 67/02* (2013.01); *H04L 65/4069* (2013.01); *H04L 65/607* (2013.01);
(Continued)

(58) Field of Classification Search
CPC ... H04L 67/02; H04L 65/4069; H04L 65/607; H04L 65/608; H04L 65/80; H04L 69/163;
(Continued)

(56) References Cited

U.S. PATENT DOCUMENTS

| | | | |
|---|---|---|---|
| 2003/0002588 A1* | 1/2003 | Faller ............. | H04B 14/04 375/242 |
| 2006/0129631 A1* | 6/2006 | Na ............. | H04L 29/06 709/203 |

(Continued)

FOREIGN PATENT DOCUMENTS

| | | | |
|---|---|---|---|
| EP | 1320996 A2 | 6/2003 | |
| EP | 1320996 B1 * | 12/2007 | ............. H04N 19/15 |

OTHER PUBLICATIONS

International Search Report issued in International Application No. PCT/EP2018/065381, dated Aug. 31, 2018 (3 pages).

(Continued)

*Primary Examiner* — Tan Doan
(74) *Attorney, Agent, or Firm* — Rothwell, Figg, Ernst & Manbeck, P.C.

(57) ABSTRACT

A method performed by a client for upstreaming to a server a live media feed is provided. The method includes the client establishing a transport layer connection with the server; transmitting to the server a first message having a header and a body; and storing in a transmit buffer media data corresponding to the live media feed as the media data is generated. The header does not indicate the size of the body. A quality setting is used to generate the media data. Transmitting the body includes:
1) transmitting to the server at least a portion of the media data;
2) removing from the transmit buffer said at least a portion of the media data;
3) determining whether the client should modify the quality setting that is used to generate the media data, and
4) repeating steps (1), (2) and (3) until a cease transmission trigger is detected.

22 Claims, 13 Drawing Sheets

(51) Int. Cl.
*H04N 21/258* (2011.01)
*H04N 21/4402* (2011.01)
*H04N 21/845* (2011.01)
*H04N 21/2187* (2011.01)
*H04N 21/4223* (2011.01)

(52) U.S. Cl.
CPC ............ *H04L 65/608* (2013.01); *H04L 65/80* (2013.01); *H04L 69/163* (2013.01); *H04N 21/2187* (2013.01); *H04N 21/25825* (2013.01); *H04N 21/4223* (2013.01); *H04N 21/440218* (2013.01); *H04N 21/8456* (2013.01)

(58) Field of Classification Search
CPC ......... H04N 21/2187; H04N 21/25825; H04N 21/4223; H04N 21/440218; H04N 21/8456; H04N 19/15; H04N 21/2401; H04N 21/23655; H04N 21/2743
USPC ........................................................ 709/231
See application file for complete search history.

(56) References Cited

U.S. PATENT DOCUMENTS

| | | | | |
|---|---|---|---|---|
| 2006/0233237 A1* | 10/2006 | Lu | ..................... | H04N 19/176 375/240.03 |
| 2012/0128333 A1* | 5/2012 | Miyake | ................ | H04N 21/235 386/259 |
| 2013/0219074 A1 | 8/2013 | Dahl et al. | | |
| 2013/0286879 A1* | 10/2013 | ElArabawy | ...... | H04N 21/26208 370/252 |
| 2015/0249845 A1* | 9/2015 | Tirosh | ..................... | H04H 60/05 725/62 |
| 2015/0271233 A1* | 9/2015 | Bouazizi | .......... | H04N 21/44209 709/219 |
| 2016/0088326 A1* | 3/2016 | Solomon | .............. | H04N 21/254 725/12 |
| 2016/0119657 A1* | 4/2016 | Sun | ..................... | H04N 21/6118 725/94 |
| 2017/0099513 A1* | 4/2017 | Furbeck | ........... | H04N 21/85406 |

OTHER PUBLICATIONS

Written Opinion issued in International Application No. PCT/EP2018/065381, dated Aug. 31, 2018 (9 pages).

J. Vieron and C. Guillemot, "Real-time constrained TCP-compatible rate control for video over the Internet," in IEEE on Multimedia, vol. 6, No. 4, pp. 634-646, Aug. 2004. Transactions.

C.Lottermann, S. Gül, D.Schroeder, E.Steinbach, Network-Aware Video Level Encoding for Uplink Adaptive HTTP Streaming, 2015 IEEE International Conference on Communications (ICC), 7 pages.

H. Parmar, Ed. et al., Real-Time-Messaging Protocol (RTMP), Dec. 21, 2012, 52 pages.

* cited by examiner

APPARATUSES, METHODS, COMPUTER PROGRAMS, AND COMPUTER PROGRAM PRODUCTS FOR LIVE UPLINK ADAPTIVE STREAMING

CROSS REFERENCE TO RELATED APPLICATIONS

This application is a continuation-in-part of International Application PCT/EP2018/065381, with an international filing date of Jun. 11, 2018, designating the United States, and which claims priority to U.S. Provisional Application 62/522,422, filed on Jun. 20, 2017, the disclosures of which are incorporated herein by reference in their entirety. This application further claims priority to U.S. Provisional Application 62/623,779, filed on Jan. 30, 2018, the disclosure of which is also incorporated herein by reference in its entirety.

TECHNICAL FIELD

Disclosed are embodiments related to live uplink adaptive streaming using the Hypertext Transfer Protocol (HTTP).

BACKGROUND

The most common streaming protocol for uplink streaming (i.e., streaming from a client to a server) is the Real Time Messaging Protocol (RTMP), which is proprietary to Adobe (see www.adobe.com/devnet/rtmp.html). Initially, RTMP was developed for streaming of Flash Video from a server to a client. But today RTMP is mostly used for uplink streaming. RTMP uses the Transmission Control Protocol (TCP) for reliable uplink streaming. RTMP is a complete alternative realization compared to HTTP. RTMP streams can be identified by the RTMP protocol handler scheme (rtmp://), so that URLs in form of rtmp://ex.com/live.swf can be interpreted by an application.

RTMP has several shortcomings. For example, there is no rule or way to add video, audio, or closed-captioning solutions, since the specification is not controlled by an open-standardization body or community.

SUMMARY

Another drawback of RTMP is that its use is not as widespread as HTTP. Accordingly, it would be beneficial to perform live uplink streaming using HTTP. An additional benefit of HTTP is that all HTTP specific security functions like HTTPS or source authentication can be re-used.

C. Lottermann, et. al, "Network-Aware Video Level Encoding for Uplink Adaptive HTTP Streaming," 2015 IEEE International Conference on Communications (ICC) ("Lottermann"), describes uplink streaming using HTTP. In the system disclosed in Lottermann, however, the video packager is co-located with an HTTP server that functions to receive requests from remote HTTP clients and stream the video to the remote HTTP clients in response to the requests. This realization locates the HTTP client in the infrastructure and puts the HTTP server on the client device side (i.e., camera side).

A problem with the system disclosed in Lottermann is that many users that want to produce an uplink video stream are shielded and protected by firewalls or other security features such as usage network address translators (NATs) in combination with dynamic IP address allocating using, for example, Dynamic Host Configuration Protocol (DHCP). For example, a device in a home network is typically shielded by a firewall that does not allow clients external to the home network to establish a TCP connection to the device (that is, reaching a device inside the home from an external device using, for example, TCP or HTTP connections, is prohibited). This protects the device from hackers outside of the home network. This disadvantage is also present in mobile environments. Typically, operators shield and protect mobile devices (e.g., smartphones) from Internet-oriented traffic to protect mobile devices from hacking, denial-of-service, and spamming attacks. Only the user (i.e. the mobile device) can initiate or establish a session with a server (not the other way around).

This disclosure describes embodiments that overcome this disadvantage. Embodiments provide a new live uplink video solution in which an HTTP client is located on the client device side (i.e., camera side) as opposed to locating an HTTP server on the camera side as has been proposed. This overcomes the above described firewall problem while still enabling the use of existing and widely available HTTP libraries and infrastructures. HTTP over TCP provides a reliable and elastic transport mechanism. The elasticity ensures that session throughput is adjusted as quickly as possible to the available link bitrate. A live source continuously produces media frames, which should be uploaded as quickly as possible.

In embodiments described herein, an HTTP client running on a client device (or located in relatively close proximity to the client device) establishes a connection (e.g., an HTTPS connection) to an HTTP ingest server using an HTTP request. Live uplink media (audio and/or video) is then provided within the HTTP body of the HTTP request. The HTTP client may use HTTP 1.0 principles to pipe the media content directly into the HTTP body or it may use HTTP 1.1 Chunked Transfer Encoding. HTTP Chunked Transfer Encoding allows the client to re-use the established TCP connection for subsequent HTTP transactions (persistent TCP connection). Hence, disclosed herein are embodiments related to the use of the HTTP request body for a live uplink stream from an HTTP client to an HTTP Server. Among other things, this enables leveraging the reliability and elasticity of an HTTP session to adjust the transmission bitrate to the available link bitrate.

Embodiments provide a new rate adaptation scheme that monitors the progress of the elastic rate adaptation scheme and ensures that the client send-buffer is uploading the live video feed within a delay constraint and/or is not adding too much jitter.

Embodiments provide new HTTP server functions able to accept the new live video solution. In embodiments, the client may start the live uplink video within the HTTP request. The HTTP server may then pipe the received data chunks to post-processing functions (e.g., as they are received and before receiving all chunks).

Embodiments described below demonstrate how to use HTTP in combination with fragmented MP4 (fMP4) and HTTP Chunked Transfer Encoding to do live uplink streaming. Embodiments provide a bitrate adaptive live uplink solution, which can leverage TCP-level retransmission (i.e. no separate UDP retransmission server is needed), rate control, and congestion avoidance principles, but can still do media bitrate adaptation.

Embodiments can serve as alternatives to approaches such as MPEG Transport Streams (MPEG2-TS), MPEG Media Transport (MMT), or the proprietary RTMP.

Also disclosed are embodiments related to extending existing HTTP servers to start piping any received data chunk from the request to any post-processing function, like de-jitter buffers and ABR transcoders/packagers (i.e., prior to receiving all data chunks from the request).

Accordingly, in one aspect there is provided a method performed by a client apparatus ("client") for upstreaming to a server a live media (audio and/or video) feed produced by a media source (e.g., camera). In one embodiment, the method includes the client establishing a transport layer connection (e.g., TCP connection) with the server. The method also includes the client transmitting to the server over the transport layer connection a first message (e.g., a Hypertext Transfer Protocol (HTTP) Request message) comprising a header and a body, wherein the header of the first message (e.g., HTTP Request message) does not indicate the size of the body of the first message (e.g., HTTP Request message). The method also includes the client storing in a transmit buffer media data corresponding to the live media feed as the media data is generated, wherein a quality setting is used to generate the media data. Transmitting the body of the first message (e.g., HTTP Request message) to the server over the transport layer connection comprises: 1) the client transmitting to the server over the transport layer connection at least a portion of the media data currently stored in the transmit buffer; 2) the client removing from the transmit buffer said at least a portion of the media data; 3) the client determining whether the client should modify the quality setting that is used to generate the media data corresponding to the live media feed, and 4) the client repeating steps (1), (2) and (3) until a cease transmission trigger is detected.

In some embodiments, the transport layer connection includes a TCP connection and/or a QUIC connection, and in embodiments the first message is transmitted over the transport layer connection utilizing HTTP 1.1 and/or HTTP 2 protocols, or is transmitted over the transport layer connection directly, without utilizing an HTTP protocol. In some embodiments, the media source is a camera. In some embodiments the camera is an integral part of the client; in other embodiments, the camera is remote from the client (e.g., a camera on a drone connected to the client over a link such as a Bluetooth connection). In embodiments, the trigger is based on a schedule specifying a time duration, and the client detects the trigger as a result of detecting that the time duration has elapsed.

In some embodiments, the method further includes the client using a first quality setting to encode a first set of media frames generated by the media source to produce a first set of encoded media frames. The media data stored in the transmit buffer includes the first set of encoded media frames; and the step of transmitting the body of the first message (e.g., HTTP Request message) further includes the client transmitting first codec configuration information, where the first codec configuration information includes information indicating the first quality setting. The method further includes the client monitoring the amount of data stored in the transmit buffer; the client determining that the amount of data stored in the transmit buffer exceeds a threshold; and as a result of determining that the amount of data stored in the transmit buffer exceeds the threshold, the client using a second quality setting to encode a second set of media frames generated by the media source to produce a second set of encoded media frames. The method further includes the client storing in the transmit buffer further media data corresponding to the live media feed, where the further media data comprises the second set of encoded media frames. The step of transmitting the body of the first message (e.g., HTTP Request message) further includes the client transmitting second codec configuration information, wherein the second codec configuration information includes information indicating the second quality setting.

In some embodiments, the method further includes the client encoding a first set of media frames generated by the media source to produce a first set of encoded media frames, wherein the media data stored in the transmit buffer comprises the first set of encoded media frames; the client monitoring the amount of data stored in the transmit buffer; the client determining that the amount of data stored in the transmit buffer exceeds a threshold; and as a result of determining that the amount of data stored in the transmit buffer exceeds the threshold, the client dropping from the transmit buffer at least a subset of the first set of media frames such that the dropped frames are not transmitted to the server. In some embodiments, said transmit buffer stores a media fragment comprising said subset of media frames and further comprising meta data regarding the subset of media frames, and the step of dropping from the transmit buffer said subset of the media frames comprises dropping the media fragment from the transmit buffer such that the media fragment is not transmitted to the server.

In some embodiments, the method further includes the client obtaining uncompressed video frames generated by the media source; the client encoding the uncompressed video frames to produce encoded video frames; the client generating a video fragment comprising: i) the encoded video frames and ii) meta-data pertaining to the encoded video frames; and the client storing the fragment in the transmit buffer. In embodiments, the video fragment is one of: i) an ISO-BMFF video fragment and ii) a Common Media Application Format (CMAF) video fragment.

In some embodiments, the live feed can be further processed by the receiving entity (server) for live distribution. In embodiments, the client transmitting to the server over the transport layer at least a portion of the media data currently stored in the transmit buffer comprises transmitting a data chunk comprising at least a portion of the media data currently stored in the transmit buffer. In embodiments, said determining whether the client should modify the quality setting that is used to generate the media data corresponding to the live media feed is based on transmit buffer level and/or changes in the transmit buffer level over time (e.g., buffer level gradient).

In another aspect, a method performed by a server for receiving from a client a live media (audio and/or video) feed produced by a media source is provided. The method includes receiving over a transport layer connection (e.g., TCP connection) with the client, a header for a first message (e.g., HTTP Request message) comprising a body. The header does not indicate the size of the body of the first message (e.g., HTTP Request message). The method further includes, after receiving the header, receiving the body of the first message (e.g., HTTP Request message). Receiving the body of the first message (e.g., HTTP Request message) includes receiving a first data chunk from the client; receiving a second data chunk from the client; and after receiving the first data chunk and before receiving the second data chunk, forwarding the first data chunk to a distribution system for distributing the streaming video.

In another aspect, a client (e.g., on a mobile device or user equipment (UE)) for upstreaming to a server a live media (audio and/or video) feed produced by a media source is provided. The client is adapted to establish a transport layer connection (e.g., TCP connection) with the server; transmit to the server over the transport layer connection a first message (e.g., a Hypertext Transfer Protocol (HTTP) Request message) comprising a header and a body, wherein the header of the first message (e.g., HTTP Request message) does not indicate the size of the body of the first message (e.g., HTTP Request message); and store in a transmit buffer media data corresponding to the live media feed as the media data is generated. A quality setting is used to generate the media data. Transmitting the body of first message (e.g., HTTP Request message) to the server over the transport layer connection includes: 1) the client transmitting to the server over the transport layer connection at least a portion of the media data currently stored in the transmit buffer; 2) the client removing from the transmit buffer said at least a portion of the media data; 3) the client determining whether the client should modify the quality setting that is used to generate the media data corresponding to the live media feed, and 4) the client repeating steps (1), (2) and (3) until a cease transmission trigger is detected.

In another aspect, a client (e.g., on a mobile device or user equipment (UE)) for upstreaming to a server a live media (audio and/or video) feed produced by a media source, is provided. The client includes a transport module configured to establish a transport layer connection (e.g., TCP connection) with the server; a transmitting module configured to transmit to the server over the transport layer connection a first message (e.g., a Hypertext Transfer Protocol (HTTP) Request message) comprising a header and a body, wherein the header of the HTTP Request message does not indicate the size of the body of the first message (e.g., HTTP Request message); and a data storage module configured to store in a transmit buffer media data corresponding to the live media feed as the media data is generated. A quality setting is used to generate the media data. Transmitting the body of the first message (e.g., HTTP Request message) to the server over the transport layer connection includes: 1) the client transmitting to the server over the transport layer connection at least a portion of the media data currently stored in the transmit buffer; 2) the client removing from the transmit buffer said at least a portion of the media data; 3) the client determining based on transmit buffer level and/or changes in the transmit buffer level over time (e.g., buffer level gradient) whether the client should modify the quality setting that is used to generate the media data corresponding to the live media feed, and 4) the client repeating steps (1), (2) and (3) until a cease transmission trigger is detected.

In another aspect, a client (e.g., on a mobile device or user equipment (UE)) for upstreaming to a server a live media (audio and/or video) feed produced by a media source is provided. The client includes a receiver; a transmitter; a data storage system; and a data processing apparatus comprising a processor. The data processing apparatus is coupled to the data storage system, the transmitter, and the receiver, and the data processing apparatus is configured to: establish a transport layer connection (e.g., TCP connection) with the server; transmit to the server over the transport layer connection a first message (e.g., a Hypertext Transfer Protocol (HTTP) Request message) comprising a header and a body, wherein the header of the first message (e.g., HTTP Request message) does not indicate the size of the body of the first message (e.g., HTTP Request message); and store in a transmit buffer media data corresponding to the live media feed as the media data is generated. A quality setting is used to generate the media data. Transmitting the body of the first message (e.g., HTTP Request message) to the server over the transport layer connection includes: 1) the client transmitting to the server over the transport layer connection at least a portion of the media data currently stored in the transmit buffer; 2) the client removing from the transmit buffer said at least a portion of the media data; 3) the client determining whether the client should modify the quality setting that is used to generate the media data corresponding to the live media feed, and 4) the client repeating steps (1), (2) and (3) until a cease transmission trigger is detected.

In another aspect, a server for receiving from a client a live media (audio and/or video) feed produced by a media source is provided. The server is adapted to: receive over a transport layer connection (e.g., TCP connection) with the client, a header for a first message (e.g., HTTP Request message) comprising a body. The header does not indicate the size of the body of the first message (e.g., HTTP Request message). The server is further adapted to, after receiving the header, receive the body of the first message (e.g., HTTP Request message). Receiving the body of the first message (e.g., HTTP Request message) comprises: receiving a first data chunk from the client; receiving a second data chunk from the client; and after receiving the first data chunk and before receiving the second data chunk, forwarding the first data chunk to a distribution system for distributing the streaming video.

In another aspect, a server for receiving from a client a live media (audio and/or video) feed produced by a media source is provided. The server includes a first receiving module configured to receive over a transport layer connection (e.g., TCP connection) with the client, a header for a first message (e.g., HTTP Request message) comprising a body, wherein the header does not indicate the size of the body of the first message (e.g., HTTP Request message); a second receiving module configured to, after receiving the header by the first receiving module, receive the body of the first message (e.g., HTTP Request message). Receiving the body of the first message (e.g., HTTP Request message) includes: receiving a first data chunk from the client; receiving a second data chunk from the client; and after receiving the first data chunk and before receiving the second data chunk, forwarding by a forwarding module the first data chunk to a distribution system for distributing the streaming video.

In another aspect, a server for receiving from a client a live media (audio and/or video) feed produced by a media source is provided. The server includes a receiver; a transmitter; a data storage system; and a data processing apparatus comprising a processor, wherein the data processing apparatus is coupled to the data storage system. The transmitter, and the receiver, and the data processing apparatus is configured to: receive over a transport layer connection (e.g., TCP connection) with the client (102), a header for a first message (e.g., HTTP Request message) comprising a body, wherein the header does not indicate the size of the body of the first message (e.g., HTTP Request message); and after receiving the header, receive the body of the first message (e.g., HTTP Request message). Receiving the body of the first message (e.g., HTTP Request message) includes: receiving a first data chunk from the client; receiving a second data chunk from the client; and after receiving the first data chunk and before receiving the second data chunk, forwarding the first data chunk to a distribution system for distributing the streaming video.

The above and other embodiments are described below.

BRIEF DESCRIPTION OF THE DRAWINGS

The accompanying drawings, which are incorporated herein and form part of the specification, illustrate various embodiments.

DETAILED DESCRIPTION

Figure 1:
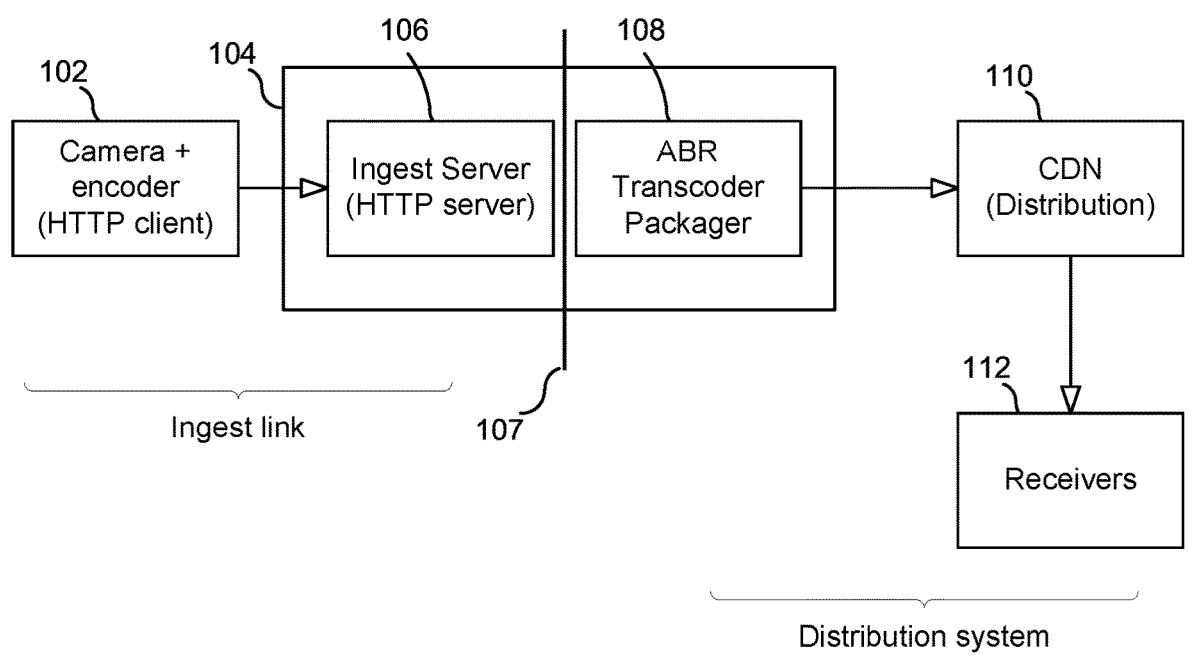
FIG. 1 illustrates a network architecture according to some embodiments.

FIG. 1 illustrates the end-to-end architecture of an exemplary embodiment. As shown, a client apparatus 102 (or "client 102" for short) is in communication with a media processing unit 104 comprising an HTTP server 106 (also called the ingest server). This forms the contribution link (a.k.a., "ingest link"), i.e., the link from the client 102 (i.e., the media source) to media processing unit 104 (i.e. the media sink). Media processing unit 104 may further include a transcoder-packager 108 (e.g., an Adaptive Bitrate (ABR) transcoder). As indicated by line 107, HTTP server 106 (ingress) may be decoupled from transcoder-packager 108 (egress); that is, media processing unit 104 may be a single physical unit in some embodiments, and in some embodiments, the unit 104 may comprise server and transcoder-packager functions that reside on separate physical devices. The transcoder-packager 108 may be in communication with a content distribution network (CDN) 110 that further forwards the packaged media to end-user receivers 112. The transcoder-packager 108, CDN 110, and receivers 112 comprise the distribution system.

Although the term camera is used throughout, it should be appreciated that any media source may also be used (e.g., a microphone).

Embodiments provide for improvements on the contribution link from a camera (e.g., a mobile camera) to an ingest server. The contribution link is the uplink into the content preparation pipe. Conceptually this may include screening, ABR transcoding and packaging functions for distribution preparation e.g. using DASH through a CDN; alternatively, some or all of those functions may be decoupled from the contribution link and may be considered part of the distribution system.

For ingest, an HTTP ingest server solution is proposed. The HTTP ingest server 106 listens (like any other web server) for input. Typically TCP port 80 or 443 are used for HTTP traffic, though other ports are possible. The HTTP ingest server 106 may support security functions for authorization and authenticating of the client, before a secure HTTPS connection is established. The term HTTP is here used synonymously with HTTPS, since all HTTP transactions may be secured.

The HTTP ingest server 106 may be implemented in such a way to immediately forward data (as it is received) to subsequent processing functions (e.g., ABR transcoding and packaging), before the complete HTTP request is received by the server. This behavior is in contrast to prior art solutions which can require that the HTTP server first receive all data of an HTTP request before processing of the request is triggered. In the presently described embodiment, the HTTP ingress server 106 pipes any received HTTP chunk to a subsequent function, like ABR transcoder-packager 108. Other processing functions may also be employed in this pipeline. For example, a de-jitter buffer may also be located before the ABR transcoder to ensure continuous input into the ABR transcoder (such as de-jitter buffer 314 in FIG. 3). The post-processing functions may be co-located with the HTTP ingest server 106 or may be distributed. If distributed, the HTTP ingest server 106 may pipe data over the network, for example, using HTTP or other protocols, to the post-processing functions.

After ingest, the ABR transcoder and packager functions then prepare the content for distribution. The transcoding parameters may be influenced by the client 102 and may depend on the uplink quality from the client to the ingest.

The HTTP ingest server 106 may ingest the video by processing the body part of a received HTTP request (e.g., using chunked delivery or un-constraint body size). If using un-constraint body size, the client 102 may terminate the TCP connection to terminate the upload. If using chunked delivery, the client 102 can stop the upload and re-use the TCP connection for subsequent transactions (e.g., for changing the resolution of the video).

Figure 2:
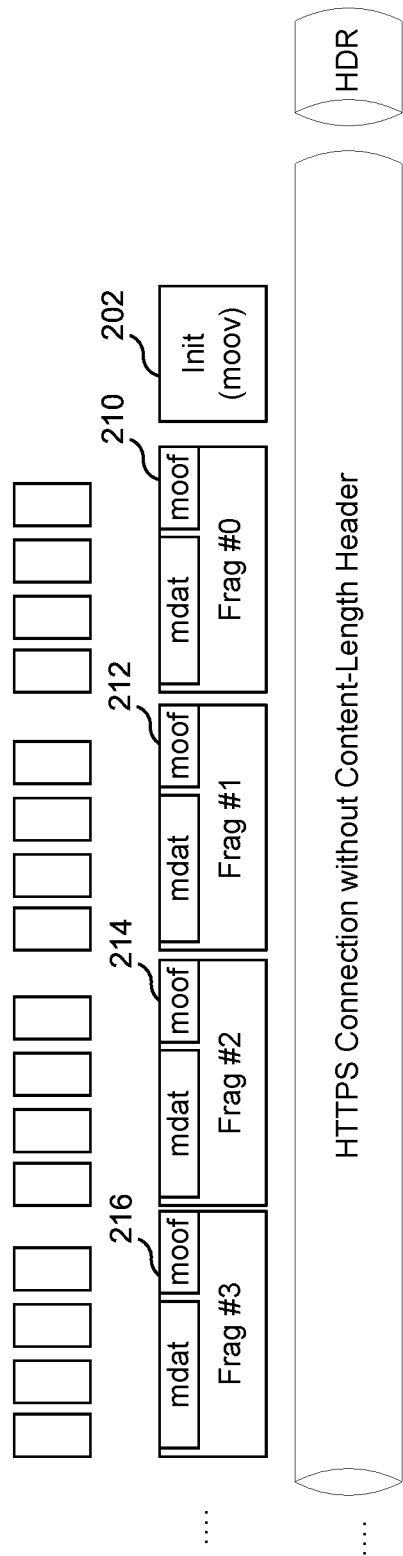
FIG. 2 illustrates a media stream broken into fragments according to some embodiments.

FIG. 2 illustrates how video may be broken up to facilitate ingestion by HTTP ingest server 106. In the example shown, client 102 is producing a continuous stream of encoded video frames. One or more such frames can be gathered into a single fragment (e.g., a Common Media Application Format (CMAF) Chunk) (e.g., fragments 210, 212, 214, 216). There is no need that a CMAF chunk contains an intra-frame. The CMAF chunk, as shown, contains at least a moof box and an mdat box. For the codec configuration, an initialization segment 202 (containing the moov box) is prepended.

As shown in FIG. 2, an HTTP 1.0 type of realization with an HTTP body of undefined length is used. Another realization would be to use HTTP chunked transfer encoding. It should be noted that an HTTP chunk (e.g., as defined by the HTTP 1.1 specification) may contain one or more fragments (or CMAF chunks). Further, a fragment may be partitioned into one or more HTTP chunk. There is no dependency between an HTTP chunk and a fragment, although in some embodiments a single fragment is contained in a single HTTP chunk.

Figure 3:
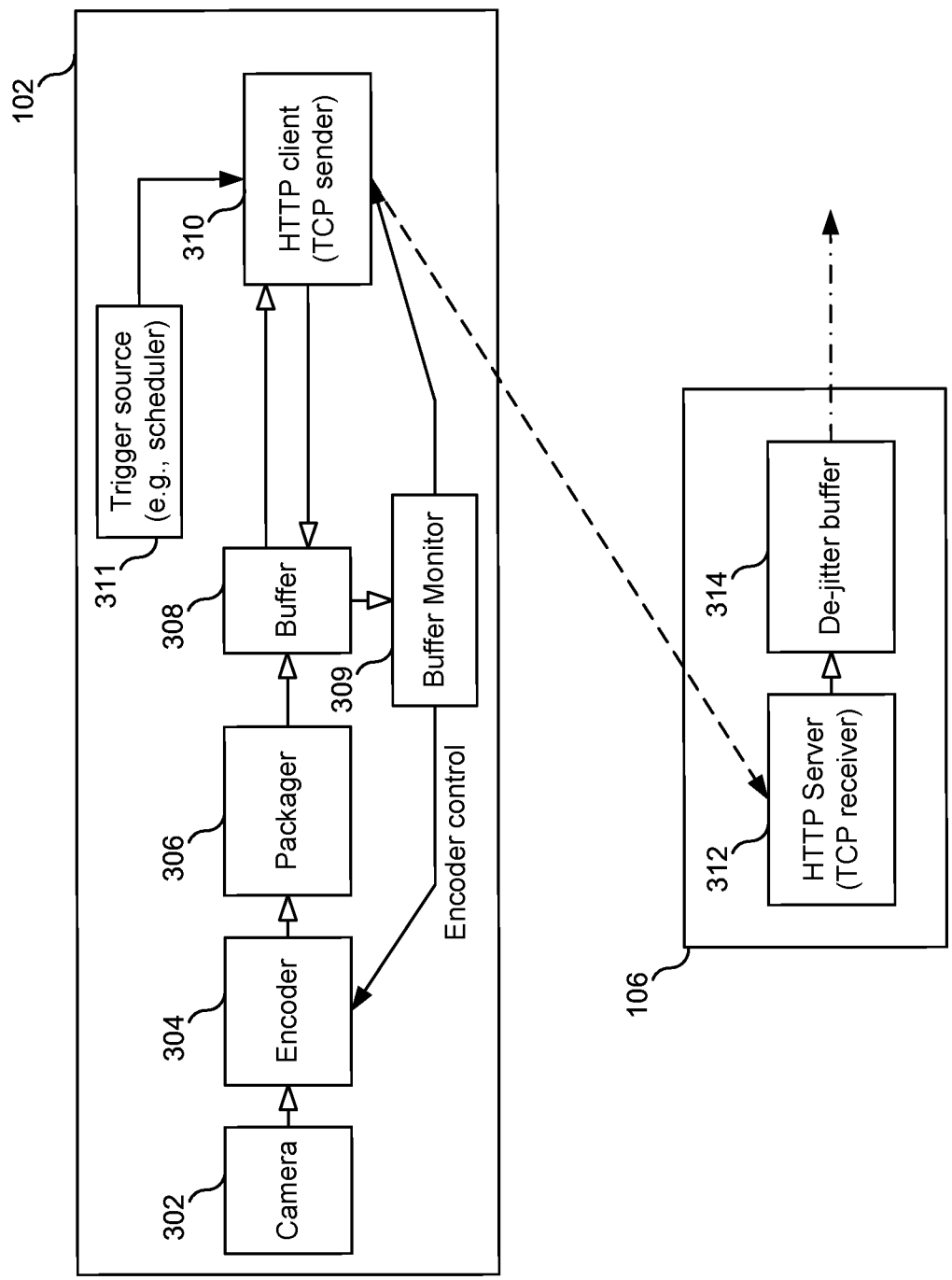
FIG. 3 illustrates a network architecture according to some embodiments.

FIG. 3 illustrates client 102 and HTTP ingest server 106 according to some embodiments.

Client 102 includes a camera 302 that provides a continuous sequence of uncompressed frames at a given frame rate. An encoder 304 then takes the sequence of uncompressed frames as input and produces a sequence of compressed frames as output. The compressed frames are structured within a group of pictures (GOP) structure. A packager 306 then collects one or more frames (having the GOP structure) and packages them into fragments. A fragment can be a CMAF chunk (e.g., at least one Movie Fragment Box (moof) and one Media Data Box (mdat) section (with optional other ISO-BMFF boxes)), an ISO-BMFF fragment, or other suitable structure. As a result, each fragment (containing a certain amount of seconds of compressed media data) has a certain size. Packager 306 then outputs fragments with a fixed interval according to the amount of compressed media data within the fragment.

Packager 306 writes the fragments (e.g., CMAF chunks) into a buffer 308, which is monitored by a buffer monitor 309. An HTTP client 310, which has opened an HTTP connection with an HTTP request, receives bytes of the fragments (e.g., CMAF chunks) from buffer 308 in order to create the body of the HTTP request. Buffer monitor 309 monitors the upload process, including the draining of the buffer 308. When the buffer level (or size) increases (i.e., when the amount of data in the buffer reaches a threshold), the monitor 309 triggers a control command to modify the encoding process or take other measures. As shown, this can take the form of a feedback loop between the encoder 304, packager 306, and monitor 309. HTTP client 310 sends data (e.g., bytes or HTTP chunks) to HTTP ingest server 106.

Client 102 may also include a trigger source 311. The trigger source may be a scheduler in some embodiments (e.g., triggering start and stop of media feed, or triggering start of media feed, at specified times and/or intervals). In some embodiments, the trigger source 311 may come from buffer monitor 309 (e.g., an indication that resolution has changed or is expected to change). Although trigger source 311 is depicted as part of client 102, trigger source 311 may also be external to client 102 in some embodiments.

The modules 302-311 of client 102 may all be housed within the same housing or they may be housed in separate housings. For example, the modules 302-311 may all be components of a mobile communication device (MCD) (e.g., smartphone, tablet, laptop computer) and housed within the housing of the MCD. As another example, camera 302 may be part of a first device (e.g., a drone) and the other components 304-311 may be part of a separate device (e.g., smartphone, laptop, tablet). In such an embodiment a wireless link may communicatively connect camera 302 with encoder 304. In some embodiments, client 102 does not include packager 306.

In the embodiment shown, HTTP ingest server 106 includes HTTP server 312 and de-jitter buffer 314.

Figure 4:
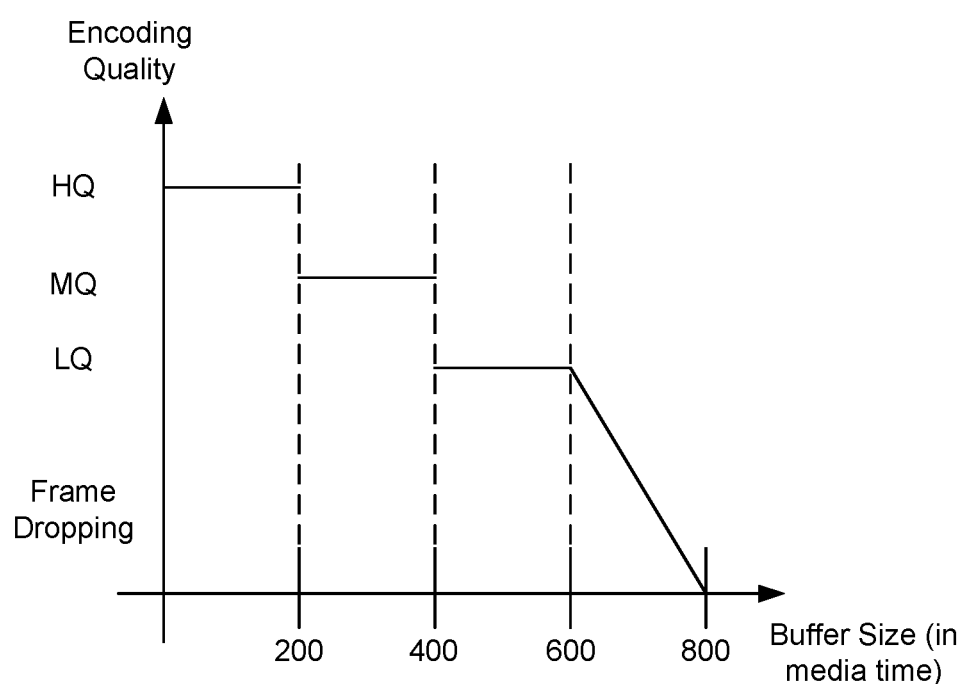
FIG. 4 is a graph showing a relationship between buffer size and encoding quality according to some embodiments.

FIG. 4 illustrates an exemplary description of how buffer monitor 309 may function in some embodiments. Along the vertical axis, encoding quality goes from "frame dropping," to "low quality" (LQ), "medium quality" (MQ), and "high quality" (HQ). Along the horizontal axis, buffer size (represented in milliseconds of media time stored in buffer 308) ranges from 0 ms to 800 ms. As shown, if buffer 308 size is below a first threshold (here 200 ms), then encoding quality is HQ. As buffer 308 fills up above the first threshold, but below a second threshold (here 400 ms), then encoding quality may be degraded to MQ. As buffer 308 further fills up above the second threshold, but less than a third threshold (here 600 ms), then encoding quality may be further degraded to LQ. As buffer 308 fills up above the third threshold, then the encoding quality may further be degraded by employing frame dropping. Buffer monitor 309 monitors the size of buffer 308 to employ a particular encoding strategy to maintain satisfactory live streaming QoS parameters. In addition to degrading the quality of encoding as buffer 308 fills up, the reverse process (i.e., improving the quality of encoding as the buffer size reduces) may also be employed. Buffer monitor 309 may consider only the current size of buffer 308, or it may consider the buffer size as a function of time, and take into consideration the past buffer sizes (or the predicted future sizes) in determining the appropriate encoding parameters.

As just described, high quality (HQ), medium quality (MQ), and Low Quality (LQ) encoding may refer to different codec configurations, resulting in a different visual quality. In some embodiments, buffer monitor 309 may modify the quantization parameters of the encoder to change the resulting bitrate of the encoded video.

The buffer monitor 309, in some embodiments, continuously checks the buffer level of buffer 308. When buffer 308 is empty at the time of appending a new CMAF chunk to the buffer, the monitor does not take any action. When the buffer level increases (indicted in compressed media time), the monitor takes control action. The first actions can be to reduce the video quality (e.g., bitrate). When the buffer level still not decrease, the monitor may start dropping frames or CMAF chunks or fragments from buffer 308. When dropping individual frames, only frames from the end of a GOP should be dropped. A GOP is a Group of Pictures, where a set of dependent pictures are grouped together with an independently decodable frame.

When each fragment contains only a part of a GOP, such as a few frames down to a single video frame (or sample in ISO-BMFF terminology), then the buffer monitor 309 can drop complete fragments. In doing so, buffer monitor 309 may also consider the coding dependency between the frames (so that dropping frames is not random, but is selectively and intelligently performed to minimize drop in quality). The buffer monitor 309 may also (e.g., if a fragment contains an entire GOP) remove data by editing (or re-writing) the fragments. For example, buffer monitor 309 may remove the data of certain video frames from the Media Data Box (mdat) and shrink the box accordingly. The Track Fragment Run box (trun) contains an entry for every sample (or video frame) in the media data box (mdat), together with the sample timing and the sample size. When samples are removed from the fragment, then the trun box needs to be adjusted, such as by removing the corresponding sample entries from the trun box and shrinking the size of the trun box by a corresponding amount. In some embodiments, fragments are constructed so that they only carry parts of a GOP (not the whole GOP), so that the buffer monitor 309 can easily drop complete frames. When each fragment contains only one frame, then the buffer monitor 309 can drop individual frames without re-writing any fragment box.

Assume that we have the following GOP structure (GOP size=8 frames): I1, B1, P1, B2, P2, B3, P3, B4. In this notation, I1 is an independently decodable picture, typically called an I-Frame or Intra-frame or Key-Frame or Random Access Point into the stream or Service Access Point into the stream; P pictures are predicted pictures, which depend on an I-Frame or other P frames; and B-Frames are bi-directional predicted frames, which depend on at least two other frames (whether I, P or B). Other frames and frame construction of dependent frames are possible.

When the fragment includes a single frame (or picture), each frame is packed into a fragment. In this example, if the buffer monitor 309 should drop frames, then frame B4 will be dropped first, followed by frames B3, B2, B1, P3, P2, P1, respectively.

Assume that we have the following GOP structure (GOP size=8 frames): I1, P1, P2, P3, P4, P5, P6, P7.

In this example, the buffer monitor 309 should drop frames P7 followed by P6, P5, P4, P3, P2, P1.

In some embodiments, the frame dropping starts from left to right considering the frame dependencies.

When the control function changes the resolution or other coding structure parameters (e.g., if the Sequence Parameter Set (SPS) or Picture Parameter Set (PPS) is modified), then the HTTP client 310 needs to stop one upload and start with a new initialization segment.

Figure 5:
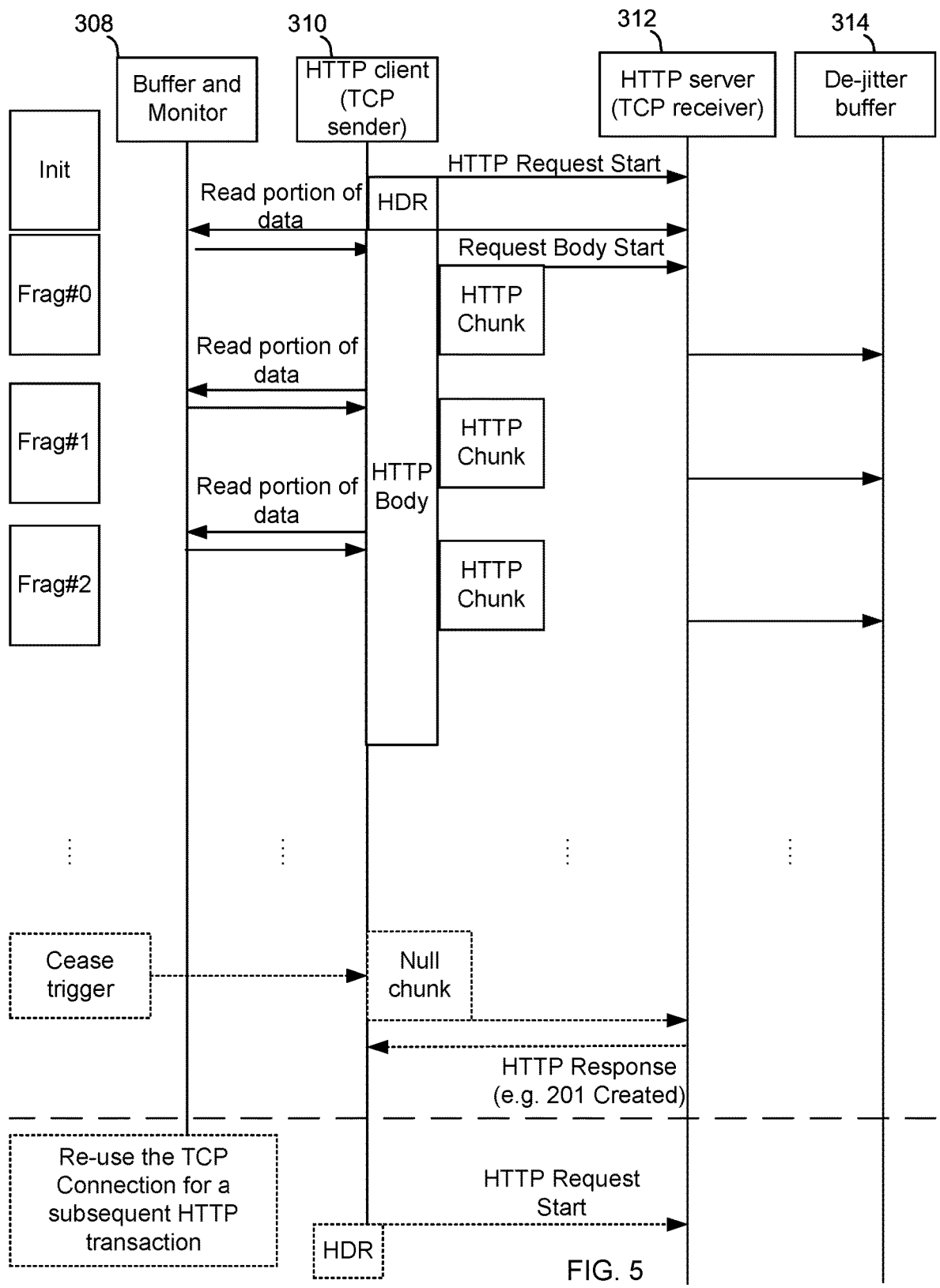
FIG. 5. is a flow chart illustrating a process according to some embodiments.

FIG. 5 illustrates an exemplary call flow for a continuous upload using HTTP chunked transfer encoding.

The HTTP client 310 opens the HTTP session with the request and the request header. For the request body, the HTTP client 310 reads from buffer 308 to upload HTTP chunks. Each HTTP chunk starts with the chunk size, followed by the chunk. In some embodiments, each HTTP chunk corresponds to a CMAF Chunk, but there is technically no alignment requirement.

There is no HTTP response from the HTTP server 312, since the HTTP Request is still in-progress. Only when the HTTP client 310 is terminating the HTTP Body with a zero size HTTP chunk, would the server respond with an HTTP response code like "200 OK" or "201 Created".

In embodiments not using chunked transfer-encoding (e.g., HTTP 1.0 transactions where this is unavailable), the HTTP client 310 then needs to terminate the TCP connection.

In embodiments using chunked transfer-encoding, it is possible to re-use the existing TCP connection for subsequent HTTP transactions (as depicted). The benefit of HTTP chunked transfer-encoding is that the HTTP body can have an unknown size at start of the HTTP transaction and it is possible to reuse an established TCP connection (persistent TCP connection)).

Since, in this embodiment, the HTTP client 310 receives input data from a live source (which is "infinitely" producing data), an external event is needed to trigger the termination of the HTTP transaction. The external event can be the end of the live feed or a resolution change of the live feed (e.g., as triggered by buffer monitor 309 when the buffer size is too large). In case of a resolution change, the HTTP client 310 needs to send new codec configuration and initialization parameters (e.g., a new moov box). In this case, the buffer monitor 309 (acting as the external trigger) would detect the need to change the codec configuration (e.g. the video resolution), stop the encoding process, and trigger the HTTP client 310 to stop the uplink traffic of HTTP chunks (but still keeping the TCP connection established). Then, the encoder process should start again (i.e. encoder 304 should resume producing video frames), but with a different resolution (or different codec configuration or otherwise different encoding parameters). At first, the encoder 304 spits out an initialization segment (e.g., an ISO BMFF moov box), which contains the codec configuration. Then, the encoder 304 provides compressed video frames into the upload buffer of buffer monitor 309 by way of packager 306.

In one embodiment, the HTTP client 310 or buffer monitor 309 discards all data from buffer 308 before re-starting the encoder 304 with a new codec configuration. In another embodiment, the old data from buffer 308 is kept in order to avoid gaps in the video time line. For example, any data in buffer 308 that has not been uploaded corresponds to frames in the video sequence.

Some encoders may not allow a change to the coding configuration like the target bitrate (e.g. through a change of the quantization parameters (QPs)). In that case, the client re-starts the encoder 304 with changed codec configuration parameters, but does not produce a new initialization segment (e.g., a moov box).

Embodiments support more realizations of external triggers, depending on the use-case. In some use-cases, like a self-flying drone or a body-cam or a surveillance cam, a remote operator can trigger a resolution change (e.g. to increase the quality or to decrease the buffer delay). Another external trigger can be a programmed schedule, where the camera is programmed to record only during a certain time (i.e. start and stop time triggers) or only for a certain duration (i.e. only a stop time trigger).

There are TCP level transactions from the server, e.g. for congestion control and retransmissions.

An example HTTP Request for an uplink live stream using HTTP chunked delivery follows:

```
POST /upload/xyz/live-session1.mp4 HTTP/1.1
Host: 192.168.1.141:9030
Transfer-Encoding: chunked
Connection: keep-alive
Accept-Encoding: gzip, deflate
Accept: */*
User-Agent: python-requests/2.9.1
20
... ftypmp42....mp42mp41isomiso2
336
...6moov...lmvhd......PKS.PKS...........................................@..................
................ltrak...\tkhd.....PKS.PKS.............................................@....
@..........mdia... mdhd......PKS.PKS..............-
hdlr........vide............VideoHandler....7minf....vmhd....................$dinf....dref.........
...url
........stbl....stsd............avcl........................@...H...H...........................
......lavcC.d......gd.....AA..............B.'....h...,....btrt.............stts..............stsc.............
..stsz................stco...........Yudta...Qmeta........!hdlr....mhlrmdir.....................$ilst....
.too....data.........x264...=udta...5meta.......!hdlr....mhlrmdir.....................ilst...<mve
x....mehd............... trex.......................
5dc
...Tmoof....mfhd...........
```

In this example, HTTP POST is used here as the HTTP method to indicate an uplink stream. Another solution could be to use HTTP PUT. The HTTP URL in the HTTP request (here/upload/xyz/live-session1.mp4) indicates the target channel of the uplink streaming session. The URL is account specific and is secured, so that only authorized senders can upload. The account owner authorizes which senders are allowed to send data.

There is no content-length HTTP header present in this example, indicating an unknown HTTP body size. The HTTP Chunked Transfer encoding is indicated in the headers (i.e. "Transfer-Encoding: chunked"), indicating that the HTTP body is a sequence of HTTP chunks.

Figure 6:
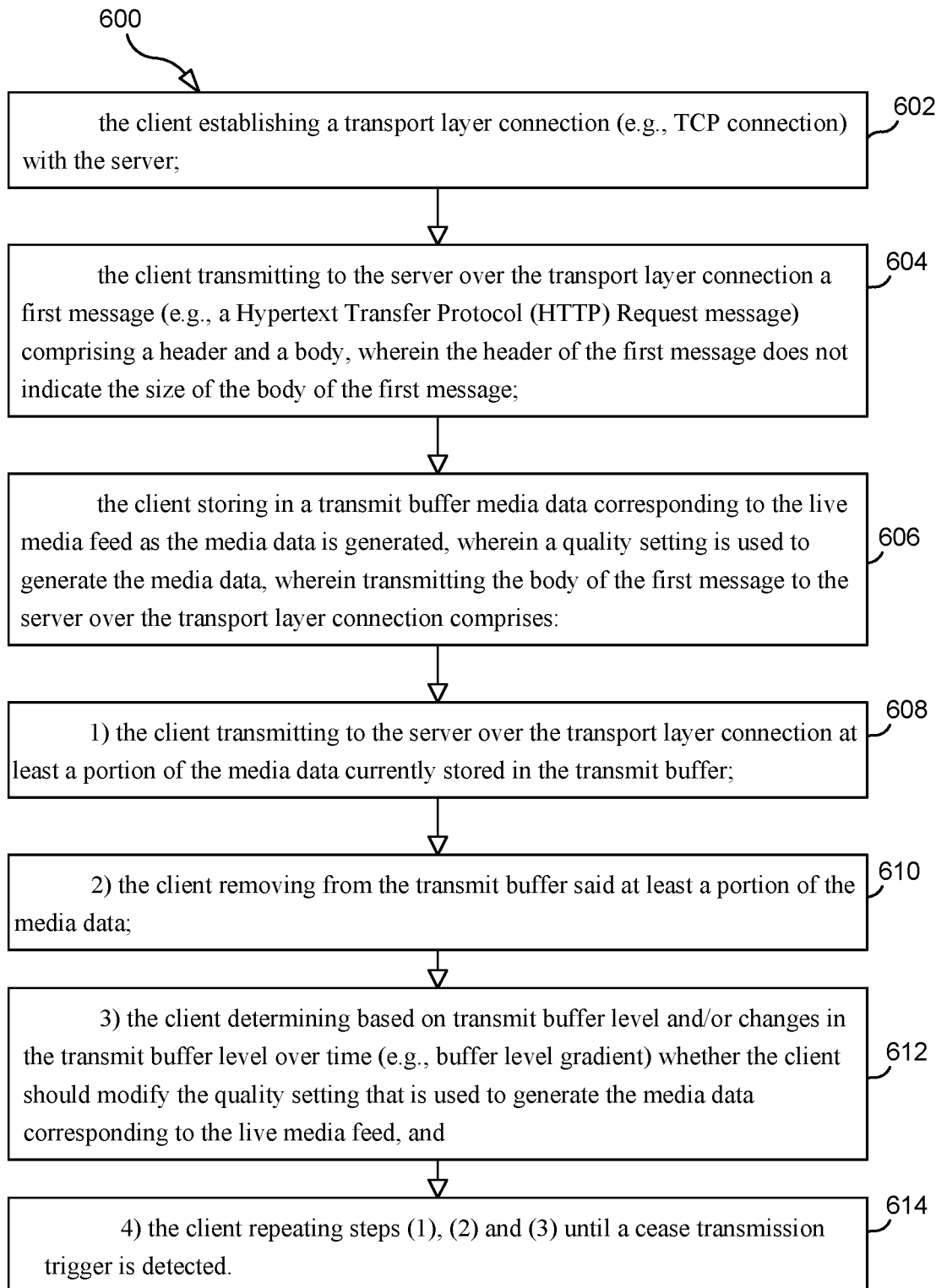
FIG. 6 is a flow chart illustrating a process according to some embodiments.

FIG. 6 illustrates a process 600. Process 600 may be performed, for example, by a client (e.g., client apparatus 102). The client establishes a transport layer connection (e.g., TCP connection) with the server (step 602). The client transmits to the server over the transport layer connection a first message (e.g., a Hypertext Transfer Protocol (HTTP) Request message) comprising a header and a body (step 604). The header of the first message does not indicate the size of the body of the first message. The client stores in a transmit buffer media data corresponding to the live media feed as the media data is generated (step 606). A quality setting is used to generate the media data. Transmitting the body of the first message to the server over the transport layer connection comprises: 1) the client transmitting to the server over the transport layer connection at least a portion of the media data currently stored in the transmit buffer (step 608); 2) the client removing from the transmit buffer said at least a portion of the media data (step 610); 3) the client determining based on transmit buffer level and/or changes in the transmit buffer level over time (e.g., buffer level gradient) whether the client should modify the quality setting that is used to generate the media data corresponding to the live media feed (step 612), and 4) the client repeating steps (1), (2) and (3) until a cease transmission trigger is detected (step 614).

In some embodiments, the media source is a camera, and in embodiments the camera may be an integral part of the client, or it may be remote from the client (e.g., a camera on a drone connected to the client over a link such as a Bluetooth connection). In some embodiments, the trigger is based on a schedule specifying a time duration, and the client detects the trigger as a result of detecting that the time duration has elapsed.

In some embodiments, the process further includes the client using a first quality setting to encode a first set of media frames generated by the media source to produce a first set of encoded media frames. The media data stored in the transmit buffer comprises the first set of encoded media frames. The step of transmitting the body of the first message further comprises the client transmitting first codec configuration information. The first codec configuration information includes information indicating the first quality setting. The process further includes the client monitoring the amount of data stored in the transmit buffer; and the client determining that the amount of data stored in the transmit buffer exceeds a threshold. The process further includes, as a result of determining that the amount of data stored in the transmit buffer exceeds the threshold, the client using a second quality setting to encode a second set of media frames generated by the media source to produce a second set of encoded media frames. The process further includes the client storing in the transmit buffer further media data corresponding to the live media feed. The further media data comprises the second set of encoded media frames. The step of transmitting the body of the first message further comprises the client transmitting second codec configuration information. The second codec configuration information includes information indicating the second quality setting.

In some embodiments, the process further includes the client encoding a first set of media frames generated by the media source to produce a first set of encoded media frames. The media data stored in the transmit buffer comprises the first set of encoded media frames. The process further includes the client monitoring the amount of data stored in the transmit buffer; and the client determining that the amount of data stored in the transmit buffer exceeds a threshold. The process further includes, as a result of determining that the amount of data stored in the transmit buffer exceeds the threshold, the client dropping from the transmit buffer at least a subset of the first set of media frames such that the dropped frames are not transmitted to the server.

In some embodiments, the transmit buffer stores a media fragment comprising the subset of media frames and further comprising meta data regarding the subset of media frames, and the step of dropping from the transmit buffer the subset of the media frames comprises dropping the media fragment from the transmit buffer such that the media fragment is not transmitted to the server. In some embodiments, the process further includes the client obtaining uncompressed video frames generated by the media source; the client encoding the uncompressed video frames to produce encoded video frames; the client generating a video fragment comprising: i) the encoded video frames and ii) meta-data pertaining to the encoded video frames; and the client storing the fragment in the transmit buffer.

In some embodiments, the video fragment is one of: i) an ISO-BMFF video fragment and ii) a Common Media Application Format (CMAF) video fragment. In some embodiments, the live feed can be further processed by the receiving entity (server) for live distribution.

According to some embodiments, a client (e.g., on a mobile device or user equipment (UE)) is adapted to perform process 600 for upstreaming to a server a live media (audio and/or video) feed produced by a media source. According to some embodiments, a client includes a receiver; a transmitter; a data storage system; and a data processing apparatus comprising a processor, wherein the data processing apparatus is coupled to the data storage system, the transmitter, and the receiver, and the data processing apparatus is configured to perform process 600.

Figure 7:
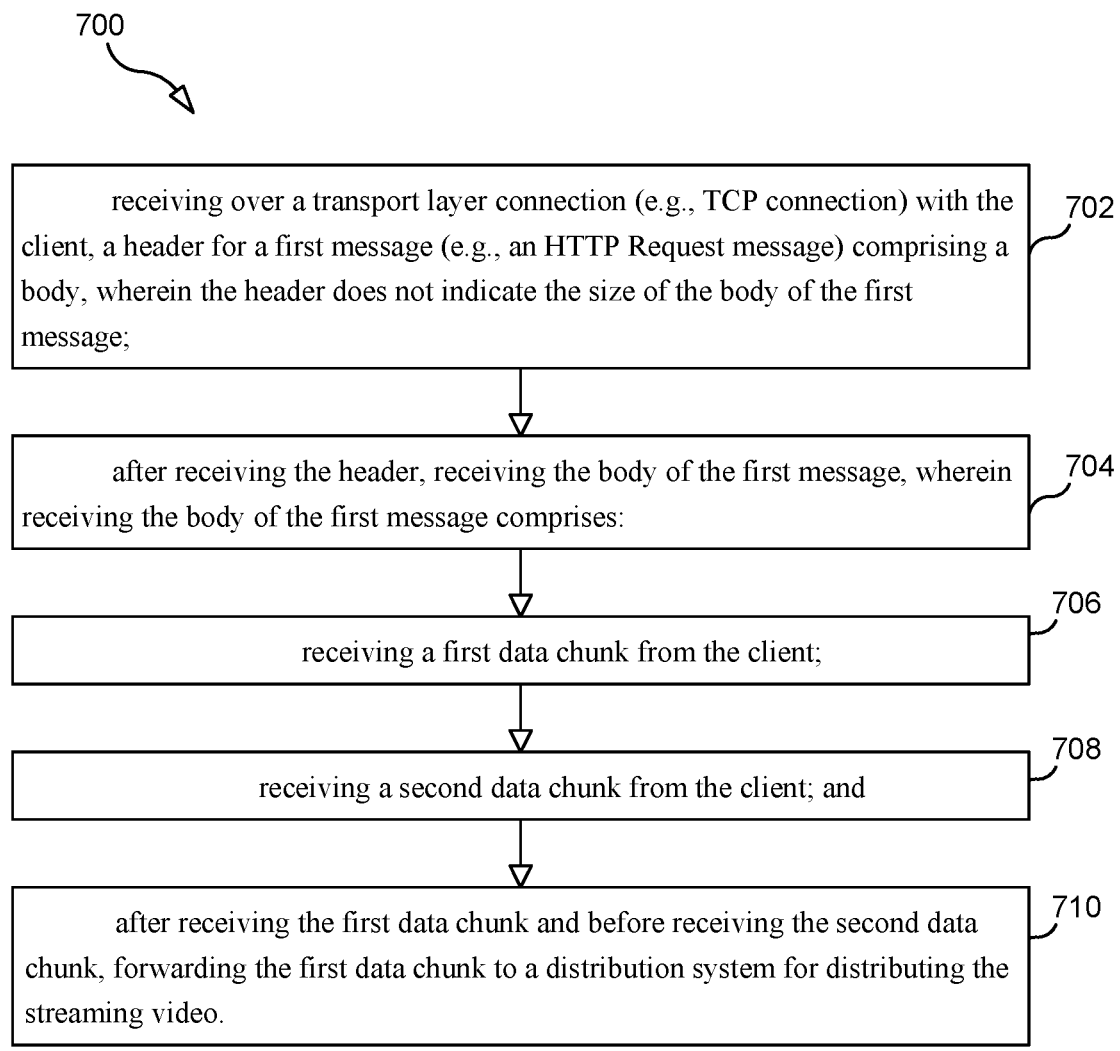
FIG. 7 is a flow chart illustrating a process according to some embodiments.

FIG. 7 illustrates a process 700. Process 700 may be performed by a server (e.g., HTTP ingest server 106) for receiving from a client a live media (audio and/or video) feed produced by a media source. The server receives over a transport layer connection (e.g., TCP connection) with the client, a header for a first message (e.g., an HTTP Request message) comprising a body (step 702). The header does not indicate the size of the body of the first message. The server, after receiving the header, receives the body of the first message (step 704). Receiving the body of the first message comprises: receiving a first data chunk from the client (step 706); receiving a second data chunk from the client (step 708); and, after receiving the first data chunk and before receiving the second data chunk, forwarding the first data chunk to a distribution system for distributing the streaming video (step 710).

According to some embodiments, a server is adapted to perform process 700 for receiving from a client a live media (audio and/or video) feed produced by a media source. According to some embodiments, a server includes a receiver; a transmitter; a data storage system; and a data processing apparatus comprising a processor, wherein the data processing apparatus is coupled to the data storage system, the transmitter, and the receiver, and the data processing apparatus is configured to perform process 700.

Figure 8:
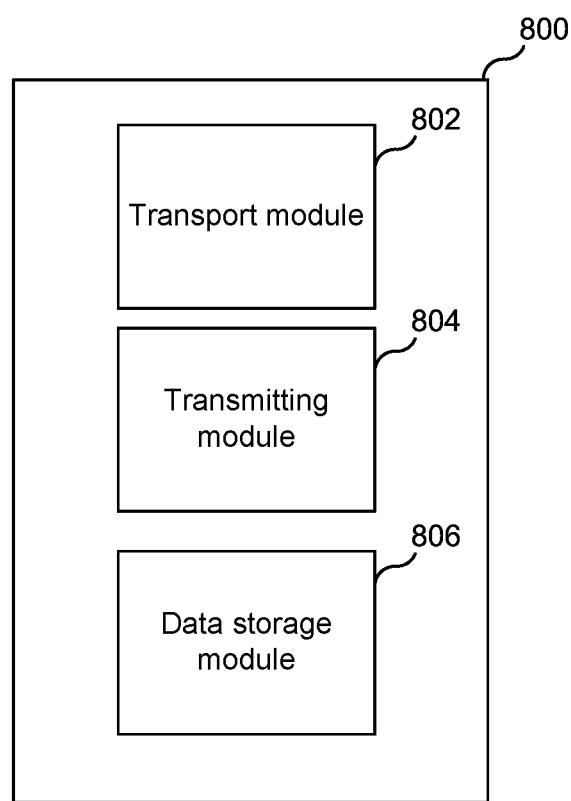
FIG. 8 is a diagram showing functional modules of an HTTP client according to some embodiments.

FIG. 8 is a diagram showing functional modules of HTTP client 800 according to some embodiments. As shown in FIG. 8, HTTP client 800 includes a transport module 802, a transmitting module 804, and a data storage module 806. HTTP client 800 may be used for upstreaming to a server a live media (audio and/or video) feed produced by a media source. Transport module 802 is configured to establish a transport layer connection (e.g., TCP connection) with the server. Transmitting module 804 is configured to transmit to the server over the transport layer connection a Hypertext Transfer Protocol (HTTP) Request message comprising a header and a body. The header of the HTTP Request message does not indicate the size of the body of the HTTP Request message. Data storage module 806 is configured to store in a transmit buffer media data corresponding to the live media feed as the media data is generated. A quality setting is used to generate the media data. Transmitting the body of the HTTP Request message to the server over the transport layer connection includes 1) the client transmitting to the server over the transport layer connection at least a portion of the media data currently stored in the transmit buffer; 2) the client removing from the transmit buffer said at least a portion of the media data; 3) the client determining based on transmit buffer level and/or changes in the transmit buffer level over time (e.g., buffer level gradient) whether the client should modify the quality setting that is used to generate the media data corresponding to the live media feed, and 4) the client repeating steps (1), (2) and (3) until a cease transmission trigger is detected.

Figure 9:
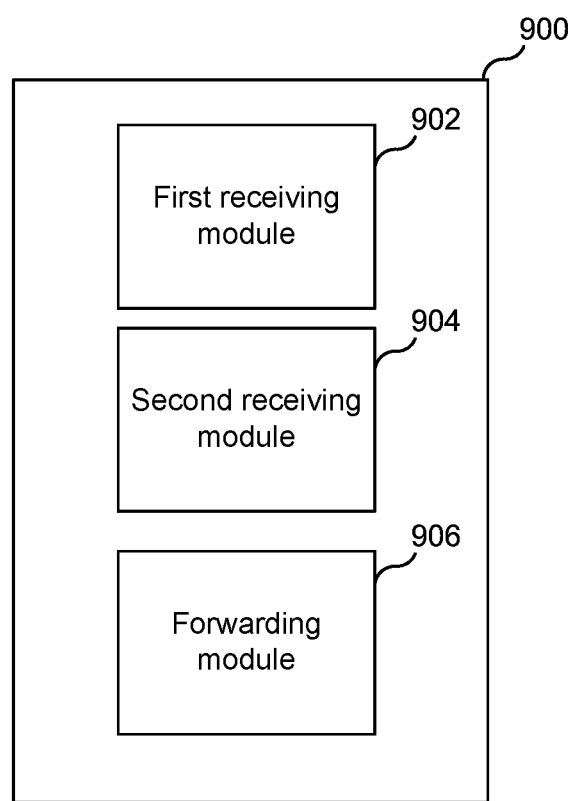
FIG. 9 is a diagram showing functional modules of an HTTP server according to some embodiments.

FIG. 9 is a diagram showing functional modules of HTTP server 900 according to some embodiments. As shown in FIG. 9, HTTP server 900 includes a first receiving module 902, a second receiving module 904, and a forwarding module 906. HTTP server 900 may be used for receiving from a client a live media (audio and/or video) feed produced by a media source. First receiving module 902 is configured to receive over a transport layer connection (e.g., TCP connection) with the client, a Hypertext Transfer Protocol (HTTP) header for an HTTP Request message comprising a body. The HTTP header does not indicate the size of the body of the HTTP Request message. Second receiving module 904 is configured to, after receiving the HTTP header by the first receiving module, receive the body of the HTTP Request message. Receiving the body of the HTTP Request message includes receiving a first data chunk from the HTTP client; receiving a second data chunk from the HTTP client; and after receiving the first data chunk and before receiving the second data chunk, forwarding by forwarding module 906 the first data chunk to a distribution system for distributing the streaming video.

Figure 10:
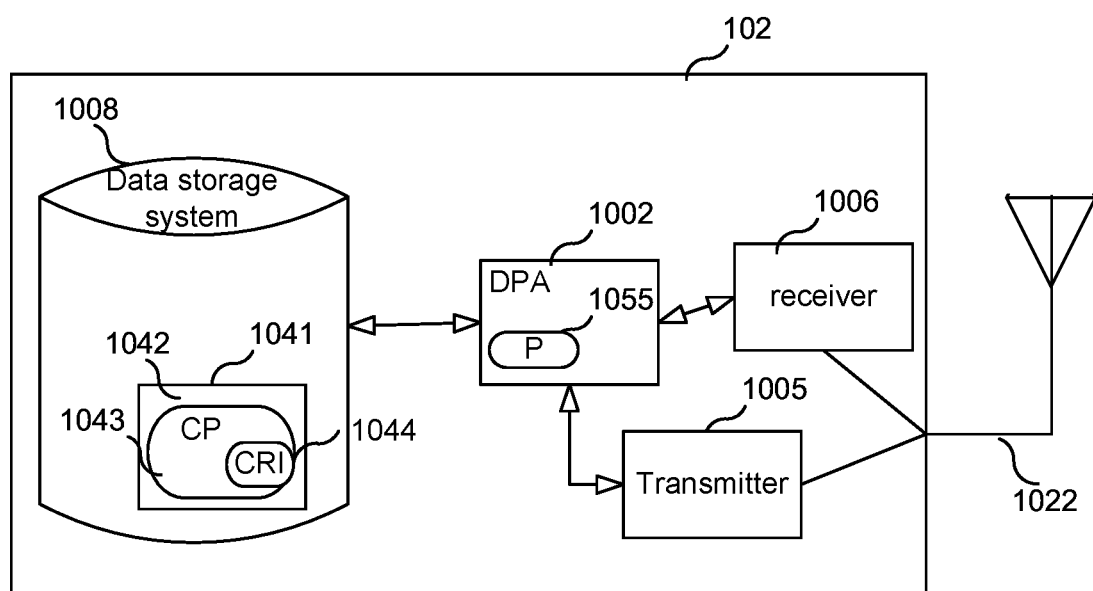
FIG. 10 is a block diagram of an HTTP client according to some embodiments.

FIG. 10 is a block diagram of HTTP client 102 according to some embodiments. As shown in FIG. 10, HTTP client 102 may comprise: a data processing apparatus (DPA) 1002, which may include one or more processors (P) 1055 (e.g., a general purpose microprocessor and/or one or more other processors, such as an application specific integrated circuit (ASIC), field-programmable gate arrays (FPGAs), and the like); a transmitter 1005 and a receiver 1004 coupled to an antenna 1022 for enabling HTTP client 102 to transmit data to and receive data from an AN node (e.g., base station); and local storage unit (a.k.a., "data storage system") 1008, which may include one or more non-volatile storage devices and/or one or more volatile storage devices (e.g., random access memory (RAM)). In embodiments where HTTP client 102 includes a general purpose microprocessor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, but not limited, to magnetic media (e.g., a hard disk), optical media, memory devices (e.g., random access memory), and the like. In some embodiments, the CRI 1044 of computer program 1043 is configured such that when executed by data processing apparatus 1002, the CRI causes HTTP client 102 to perform steps described above (e.g., steps described above with reference to the flow charts). In other embodiments, HTTP client 102 may be configured to perform steps described herein without the need for code. That is, for example, data processing apparatus 1002 may consist merely of one or more ASICs. Hence, the features of the embodiments described herein may be implemented in hardware and/or software.

Figure 11:
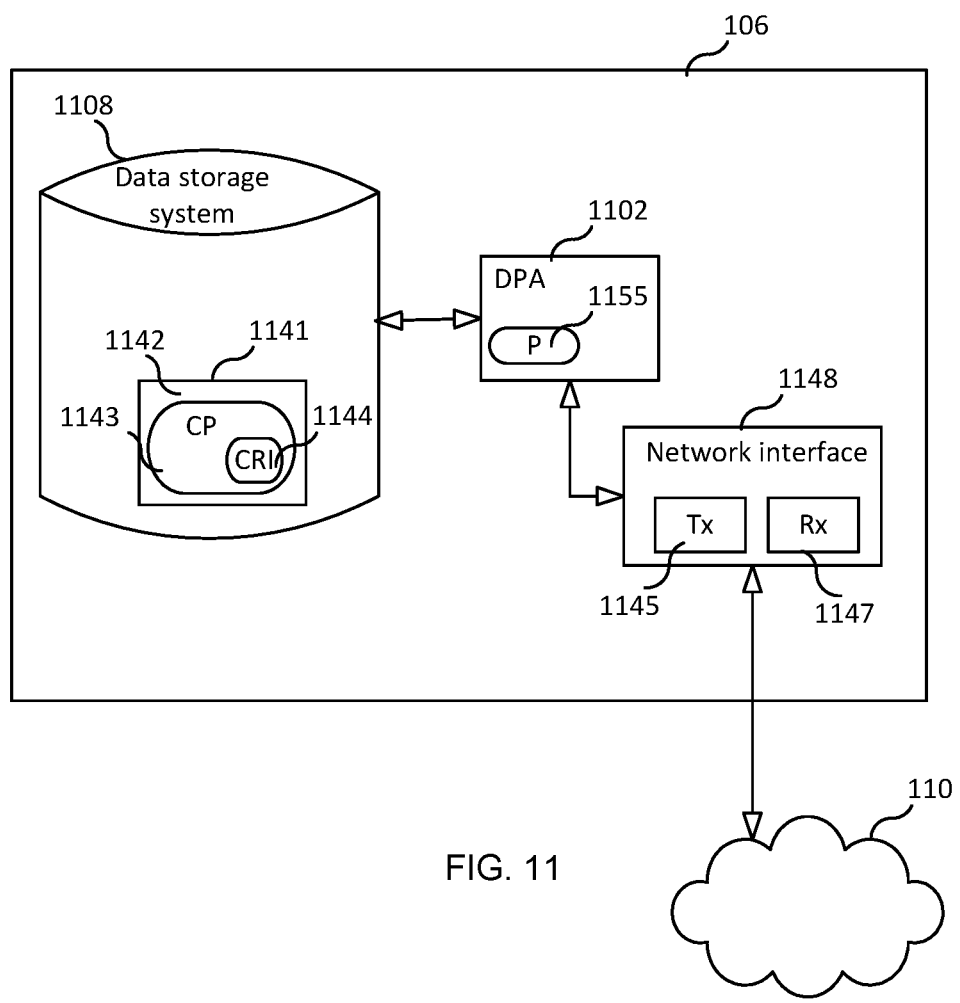
FIG. 11 is a block diagram of an HTTP server according to some embodiments.

FIG. 11 is a block diagram of HTTP server 106 according to some embodiments. As shown in FIG. 11, HTTP server 106 may comprise: a data processing apparatus (DPA) 1102, which may include one or more processors (P) 1155 (e.g., a general purpose microprocessor and/or one or more other processors, such as an application specific integrated circuit (ASIC), field-programmable gate arrays (FPGAs), and the like); a network interface 1148 comprising a transmitter (Tx) 1145 and a receiver (Rx) 1147 for enabling HTTP server 106 to transmit data to and receive data from other nodes connected to a network 110 (e.g., an Internet Protocol (IP) network) to which network interface 1148 is connected; circuitry 1103 (e.g., radio transceiver circuitry) coupled to an antenna system 1104 for wireless communication with UEs); and local storage unit (a.k.a., "data storage system") 1108, which may include one or more non-volatile storage devices and/or one or more volatile storage devices (e.g., random access memory (RAM)). In embodiments where HTTP server 106 includes a general purpose microprocessor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, but not limited, to magnetic media (e.g., a hard disk), optical media, memory devices (e.g., random access memory), and the like. In some embodiments, the CRI 1144 of computer program 1143 is configured such that when executed by data processing apparatus 1102, the CRI causes HTTP server 106 to perform steps described above (e.g., steps described above with reference to the flow charts). In other embodiments, HTTP server 106 may be configured to perform steps described herein without the need for code. That is, for example, data processing apparatus 1102 may consist merely of one or more ASICs. Hence, the features of the embodiments described herein may be implemented in hardware and/or software.

Use Cases

The evolution of smart phones and other devices like drones has emphasized the uplink direction, where such devices are equipped with high end cameras, capable of producing broadcast quality video streams. The embodiments described above are uniquely adapted to take advantage of these trends. Example use cases are described below.

One example use case is the usage of drones to capture live events; e.g., from an aerial view, where the drone can fly above the event and send the content directly to a broadcaster (or other third party) through a network (e.g., a broadband network). In such a use case, the drone may be equipped with only a high quality camera 302 and is operated manually with line-of-sight or in a follow-me mode, to follow a certain target. The drone may have a modem (e.g., 5G modem) and run any operating system running HTTP client 310. That is, a drone may be an instance of client 102. Or, in other embodiments, the camera 302 of the drone may connect over a link (such as a Bluetooth link) to a device containing modules 304-310, which device is located in proximity to the drone. As described above, such a device is operable to stream live video to a remote server 106 for immediate processing. This use-case may be used in sports events to capture events like skiing and rally races, and may be used in sports events such as the Olympics (e.g., in 2018 Olympics, 5G network may help in broadcasting and capturing different Olympic events).

Another example use case is to broadcast news from a smartphone having a camera 302. That is, a smartphone may be an instance of client 102. Smartphone technology is improving and the video quality of high end smartphones is already sufficiently good to be used in professional TV productions (such as breaking news). Embodiments can allow reporters to cover news immediately from any location with broadband access where smartphones can host a camera.

In another use case, camera 302 is a helmet camera (e.g., a camera worn by an athlete) or a body camera (e.g., a body camera worn by a policemen). The camera can stream a live image to a device containing modules 304-310, which device as described above is operable to stream live video to a remote server 106 for immediate processing. The camera might operate remotely, e.g. to decrease the capturing latency or to increase the video quality or to start/stop recording. Embodiments support the live uplink streaming of such camera feeds.

Embodiments can also be of a great use to support the trend of user generated content (UGC), where social media platforms allow users with mobile phones or body cameras to ingest live stream into their websites.

Use of Fragmented MP4 File Using ISO Base Media File Format (BMFF)

Fragmented MP4 files (fMP4) using ISO Base Media File Format (BMFF) are applicable to embodiments disclosed herein. ISO BMFF is defined in ISO/EC 14996-12. It is built upon a box structure. Each box starts with box size information (4 bytes) followed by a box type information (also 4 bytes), typically expressed as four-letters (e.g., ftyp for File Type). Boxes can be compound boxes, meaning that the box contains other child boxes. A fragmented MP4 file (or ISO-BMFF file) is structure differently like a regular MP4 file. The file starts with the file type (ftyp), followed by exactly one movie box and other boxes. The media data are described through fragments, which are the combination of a movie fragment box (moof) and an associated media data box (mdat).

The ftyp box contains compatibility information of the file and the used codecs.

The movie box (moov) contains codec configuration information. For DRM protected content, additional DRM information is included. Different to a regular MP4 file, all the time-to-samples tables are left empty. The time-to-samples table describe sample durations, sample composition, and decode time, and the precise byte-offset and length of the sample in the Media Data box.

A fragmented MP4 file contains many Media Data boxes (mdat). The mdat box contains the actual media data of the individual samples, chained back to back into the box. For each media data box in that fragmented MP4 file, there is a dedicated Movie Fragment box, which contains the timing and the byte offset information for each individual media data box.

An example fragmented MP4 file may include a given box hierarchy, now described. The file contains on top level, a single ftyp and a single moov box. Then, there are many movie fragment boxes (moof) and media data boxes (mdat). There are as many moof boxes as mdat boxe. Other boxes (e.g. for DRM descriptions), may be contained as well.

The combination of the movie fragment with the associated media data box may be considered a fragment. In some embodiments, this fragment may be the granular object that the HTTP client and server work with. In ISO/IEC 23000-19 (Common Media Application Format, or CMAF), the combination of a movie fragment box and the media data box is called a CMAF Chunk.

The moov box of a fragmented MP4 file is also called the initialization segment or initialization part, since it contains the codec configuration. In the example being described, the fragmented MP4 file may contain a single video track (trak box) using the H.264 codec (represented by an avc1 box and associated property-value entries).

Additional boxes may be contained in a fragment (combination of moof and mdat boxes). The moof box is a compound box, containing several other child boxes. The most important child boxes here are the track fragment header box (tfhd) and the track fragment run box (trun). When a fragment contains media from multiple tracks (like audio and video), then multiple track fragment (traf) boxes are present in the fragment.

An example Track Fragment Run box (trun) may indicate that the mdat section of the fragment contains only a single sample (or video frame). The data offset field (of the trun box) is a pointer into the mdat section indicating the start byte offset of the sample.

Since there is (in the presently described example) only a single sample in the fragment, there is no sample length information in the track fragment run box. The sample size is in this example contained in the track fragment header box (tfhd) as default_sample_size.

The track fragment header box may include the default_sample_duration (e.g., 100), the default_sample_size (e.g., 4318) and the default_sample_flags (e.g., 0x100c0). The default_sample_flag here describes that this is a sync sample, i.e. the sample can be used to start decoding.

The default_sample_duration (of the tfhd box) indicates the sample duration (in timescale ticks). With the track timescale from the initialization segment (in the media header box, or mdhd), one can calculate the sample duration in seconds (e.g., 100/3000 sec). The video is recorded at a framerate of 30 frames per second.

When there are multiple samples in a fragment, at least the segment size of each sample is contained in the trun box, since each sample has its own size.

Another example of the trun box is now described. The fragment may contain 30 frames and the flags may depict the coding dependency of the frame. Note that this example may be from a segmented media file, meaning that the fragment information may be combined with additional information like the styp (segment type) and optionally sidx box into a separate file.

The U.S. provisional application to which this application claims priority included an appendix that contained a proposal for modifying a standard. The relevant portion of this proposal (a.k.a., "contribution") is reproduced below.

2 General Use-Case Description and General Considerations 2.1 General Use Case and Architecture Considerations The work-item aims to standardize a framework for live uplink video streaming. One consideration is to use the means and capabilities of the various 3GPP access systems, but specifically the new capabilities and features of the new NR access technology. The various 3GPP access systems (e.g. LTE or NR) have different capabilities, which depend on the device realization (and device categories) and system deployment.

Live uplink video is typically used as contribution or ingest for a live video distribution services. The term 'contribution' is often used in professional TV productions for the live ingest of media. The main characteristics of such a video system is that the video flow is unidirectional, from the video source via some intermedia nodes to typically many receivers. The relation of the ingest link and a possible distribution system is depictured in FIG. 1. The ingest link may be decoupled from the distribution system. Or, the ingest server may just store the video data for later use or the ingest server may forward the video stream to a monitoring screen. For example, the live video of the source may be stored in a file system for later use or the video material from the live video source may be first screened and used only when a program director decides to use a specific live source.

On the distribution side, adaptive bitrate streaming (like DASH) is today commonly used. For adaptive bitrate, the content needs to be provided in multiple quality representations (called video profiles), e.g. ranging from a few hundred kbps up to several hundred Mbps. Depending on the usage, DRM protection is added for the distribution. The distribution system for IP based systems is typically a Content Delivery Network (CDN). Other distribution systems (IP and traditional broadcast systems) are certainly possible.

On the live ingest side (which is the scope of the work item), a live media source is capturing the frames, and then transmitting the frames to an ingest server (i.e. the media sink). In this document, we focus on video content, since video content generally requires much higher data rates than audio or other media. However, audio or other media are also applicable to this disclosure.

The captured video frames may be compressed for bitrate reduction before transmission over the ingest link. The contribution link in some embodiments is a 3GPP access system, which is used in the uplink direction.

Due to the presence of NATs and Firewalls in the ingest link path on the device side (e.g., personal firewalls) and over 3GPP systems (although these functions are not standardized, they still exist), the media source of the communication (e.g. Camera), should activate the communication session towards the ingest server (e.g. media sink). The reason for this is that "opening ports" in firewalls are often prohibited due to security reasons or (company) security rules. Further, when there is a Network Address Translator (NAT) in the path, there must be a dedicated NAT forwarding rule to the target device.

Client devices are often configured with dynamic IP addresses. The firewall and NAT forwarding rules typically depend on the device IP address, and thus, need to be adjusted with every IP address change.

Ingest servers, as opposed to client devices, are properly configured (e.g. to be reachable) and secured to receive incoming connections. When the ingest server is behind a NAT, then corresponding NAT forwarding rules are configured.

Therefore, although it is technically possible to run servers on the 3GPP UE side, this proposal focuses on servers separate from the UE side.

2.2 Video Compression Considerations

In the professional broadcast work, the Serial Digital Interface (SDI) is commonly used for live video handling and for sending live video from an outside event into the broadcast studio. SMPTE has defined in 2022 an RTP payload format (IETF RFC 4175) for carrying SDI signals over RTP (note that an RTP session can be established through various means). Typical SDI bitrates for high resolution video in the Gigabit range, since SDI carries either uncompressed video frames or lightly compressed video frames (e.g. using JPEG2000). The key benefit of SDI is the ability to switch on every frame (there are no GoP type of dependency structures) and the low latency (every frame is sent immediately).

3GPP uses compressed video (using H.264 or HEVC) even for the low latency conversational video of VoLTE-Video (ViLTE) in order to reduce the video bitrate. For the low latency video compression, latency is prioritized over resulting video bitrate and several compression tools like B-Frames are avoided. It is recommended to discuss and agree the target bitrates/bitrate ranges and latency limits for the 3GPP Live Uplink video solution, before starting any detailed normative work.

2.3 Adaptive Bitrate and QoS

3GPP systems support a different set of access systems like LTE or NR. Access systems have different capabilities such as supported link bitrate or QoS. The capabilities depend to a certain level on the deployment realization, e.g. allocated carrier bandwidth (e.g. LTE carries can support different bandwidth like 20 MHz, 10 Mhz). The access system may support carrier aggregation, meaning to combine uplink capacity of multiple radio carriers into a single uplink.

3GPP UE may have different capabilities, depending on the device realization and the device vendor.

The system characteristic may depend on the device movement pattern. For example, the channel characteristics may depend on whether the device is stationary or moving. When the device is moving, the device may perform handovers from one base station to other base stations or even from one access network to another access network. This could temporarily disrupt the stream, which can be mitigated by e.g. introducing additional buffering (and latency) before the ingest server.

Quality of Service (QoS) and other techniques may be used to increase the probability for availability of a certain minimum bitrate of the link ingest.

It is recommended that the target solution can benefit from Quality of Service (QoS) mechanisms of the network. However, due to the differences in 3GPP access systems, mobility and deployments, it is recommended that the uplink streaming solution can work with different bitrates and that it supports even adaptive bitrate changes.

2.4 Security Considerations

The live ingest solution needs to be properly protected against misuse. There are at least the following misuse considerations.

The live ingest solution shall be possible to use with multiple, independent media sources, sequentially or simultaneously. The solution should consider or support the usage of separate accounts for each media source. An account here is the chain of ingest and postprocessing functions (like ABR transcoders) and likely also the distribution system (i.e. how the live feed is offered to the receivers) It must be ensured that only authorized client can access and control such an account, and that each account has a unique ingest point description.

Further, when the ingest server is listening on a certain ingest point (e.g. port or URL) for incoming data, it should be ensured that only authorized sources can ingest media data into the post-processing and distribution chain. Otherwise, the live service can be hijacked or spammed by inserting alternative video or just garbage data. So, the user plane should be protected so that the ingest server can differentiate between authorized content data and un-authorized data.

2.5 Capability Exchange

As shown in FIG. 1, the ingest server (media sink) is forwarding the data to subsequent functions link ABR transcoders. For any transcoding or any video rendering, the system needs to first decode the incoming stream. A wide range of different codecs and codec profiles are available.

To ensure that the ingest server is capable of post processing the received stream, capability exchange and potentially codec negotiation is needed. The simplest form would be, that the ingest server announces or exposes its capabilities (like subtitle support or supported codecs), so that the client (media source) can select an appropriate subset for the live ingest. There are different means to expose or negotiate the settings.

A typical ingest server capability is the supported codecs and codec profiles. There are additional capabilities, like support for subtitle streams or the placement of ad-opportunity marker insertion.

The capability exposure/negotiation framework should be extensible and allow for vendor specific capabilities.

3 Realization Alternatives

There is a set of technical solutions available, which can be considered for the realization. In the following, we briefly introduce at least some of the available realization alternatives. It should be noted, that other realization alternatives are available.

3.1 RTP Based Schemes 3.1.1 General

RTP is a protocol, which is commonly used in various environments for video transmissions. There are various RTP payload formats available such as H.264 (RFC 6184) or HEVC (RFC 7798) video. There are also formats available for carrying MPEG2-Transport Stream multiplexed data inside of RTP (RFC 2250) or even uncompressed video of a Serial Digital Interface (SDI, SMPTE 2022-6) (RFC 4175). Note, the SDI is widely used in professional TV production systems.

RTP uses UDP transport and a dedicated protocol is needed to establish and configure the UDP transport. With SRTP, a security framework is available for RTP. Alternatively, or as complement, DTLS may be used.

3.1.2 IMS Base Based Live Ingest Session Establishment

3GPP conversational services are built using IMS and IMS is well suited to establish the needed RTP user plane for providing an uplink live video (3GPP TS 26.114). In the live uplink case, the Communication channel is used only for unidirectional video and possible improvements of the IMS system for this use-case should be considered.

3GPP already has support for various RTP video payload formats, specifically for H.264 and HEVC video. Other payload formats could be added, when necessary.

IMS uses SIP/SDP for establishing the unicast transport sessions and also for the codec negotiation and selection. IMS provides a framework for authorization and authentication. SRTP and/or DTLS may be used to protect the user plane ingest against misuse.

Session establishment may be with IMS. The media source is an IMS client. The media sink is the MRF (here). Another example could be that an auto-answering IMS client is used as media sink.

3GPP TS 26.114 defines a video rate control. Other RTP video rate control schemes exist, like SCReAM. One alternative is SCReAM (Self-Clocked Rate Adaptation for Multimedia) that is under standardization in IET. SCReAM handles the network congestion control and also provides with recommended bitrate for the Media Source(s). An implementation of SCReAM is available at.

3.1.3 RTSP Based Live Ingest Session Establishment

The 3GPP Packet Switched Streaming service (PSS) (3GPP TS 26.234) uses RTSP for downlink streaming session establishment. It seems natural to build a live uplink video streaming solution on RTSP, where the RTSP server (media sink) is located in the infrastructure.

Placing an RTSP server on the UE side is impractical, although technically possible. In particular consumer devices are shielded using firewalls. Some MNOs even use Network Address translations and assign IP addresses dynamically.

The RTSP client should act as media source and the RTSP server as media sink. The RTSP client shall establish the RTP uplink streaming sessions towards the RTSP server. The existing RTSP Setup procedure can be used to establish the UDP transport for the ingest link. Then, the uplink live streaming session is started using the "RTSP Record" method and potentially modified using RTSP Set Parameters.

The RTSP Describe method is used to announce the selected codec and codec configuration. A separate procedure should be used to query supported codecs by the RTSP ingest server.

Security procedures to authorize and authenticate the RTSP client and the UDP user plane data need to be studied and discussed further. SRTP or DTLS may be used to protect the user plane ingest against misuse.

Various video rate control schemes for RTP streams existing and should be implemented in order to meet the delay requirements for the case where the throughput becomes low for instance due to degraded coverage. SCReAM, as introduced in Section 3.1.2, is one realization alternative.

3.1.4 WebRTC Based Live Ingest Session Establishment

WebRTC is today widely supported in browsers for communication like services. WebRTC is designed for bi-directional communication services, but has been successfully tested and used for uni-directional streaming services. WebRTC Gateways can be used as Ingest Server.

WebRTC uses SRTP/UDP as communication transport. Security using a combination of SRTP and DTLS is built-in.

3.2 RTMP on TCP

The most common streaming protocol for uplink streaming is Adobe's Real Time Messaging Protocol (RTMP). RTMP uses TCP for reliable uplink streaming on a well-define port (i.e. port 1935). The benefit of TCP and HTTP based uplink streaming formats with the server component on the infrastructure side is prevention of Firewall and NAT issues. The use of TCP necessitates TCP configurations that ensure low latency, this involved proper setting of TCP send buffers as well as the use of congestion control algorithms that ensures low latency, the details are tbd.

RTMP streams can be identified by the RTMP protocol handler scheme (rtmp://), so that URLs in form of rtmp://ex.com/live.swf can be interpreted by an application. A separate well-known port (port 1935) is defined for RTMP schemes, so providing the port is not required. Of course, an RTMP URL allows other ports.

RTMP defines its own message format and multiplexing mechanism. In order to support RTMP, both, the sender and receive must support the needed range of RTMP message types and message handling procedures.

RTMP is a message based protocol. Each message contains a length, often a timestamp and some type information.

Messages can be subdivided into smaller RTMP chunks in order to multiplex and interleave messages. RTMP defines "Chunk streams", which can be multiplexed. Note, that there is a clear difference between RTMP chunks and HTTP chunks.

RTMP does not support all video codecs, audio codecs and closed captioning solutions. For example, HEVC seems currently not supported.

According to Wikipedia, it is possible (using RTMPT) to tunnel RTMP through HTTP. However, there is no description of this function in the RTMP specification. Traditionally, RTMP was primarily used for downlink streaming from a server to a client.

3.3 HTTP with MPEG2-TS or with Fragmented MP4

HTTP can also be used for Live Uplink video Streaming. The benefit of HTTP is, that all HTTP specific security functions like HTTPS or source authentication, can be re-used. Here, either MPEG2-TS [ISO/IEC 13818-1] or Fragmented MP4 [ISO/IEC 14996-12] are suitable formats for uplink streaming. Further, the infrastructure is configured to allow HTTP or HTTPS traffic on port 80 or 443 to traverse any intermediate firewall.

In both cases, the HTTP client on the mobile 3GPP device is opening the HTTPS connection to the HTTP Ingest server using an HTTP request. The live uplink video is then provided with the HTTP body of the request. The HTTP client may use HTTP 1.0 principles to pipe the video content directly into the HTTP body or it may use HTTP 1.1 Chunked Transfer Encoding. HTTP Chunked Transfer Encoding allows the client to re-use the established TCP connection for subsequent HTTP transactions (persistent TCP connection). As is the case with RTMP over TCP, it is important to ensure that TCP is configured correctly.

FIG. 5 illustrates a call flow using fragmented MP4 that has live ingest format on HTTP. The media source is here an HTTP client. The Media sink is here a HTTP server, which forwards the receive stream chunks immediately into the post-processing chain, illustrated here as de-jitter buffer.

The client first queries and checks the capabilities of the HTTP Ingest Server, before the live uplink stream is started. HTTP can be used to query the capabilities.

Then, the HTTP client is uploading the live stream using HTTP chunked delivery within the body of the HTTP request. The fragments, which are carried as HTTP chunks are formatted according to ISO/IEF 14996-12. The Movie Box ('moov') contains the codec, codec configuration and potentially other information. When the client terminates the live ingest, then the server provides the HTTP response (201 Created in this case).

When MPEG2_TS [ISO/IEC 13818-1] is used as ingest format, then the fragments are formatted according to MPEG2-TS.

Rate control should be implemented in this solution, this can preferably monitor the TX buffer and adjust the Media Source accordingly.

4 Solution Requirements

The following solution features (not exclusive list) are proposed for the normative work on the Live Uplink Streaming Framework:

Presence of NATs and firewalls shall be considered. The ingest server shall be placed on the infrastructure side, so that the media source is always located at the communication initiator on the 3GPP UE side.

The solution shall only focus on live ingest. The media distribution or media storage realization shall be independent from the ingest.

The solution shall support authorization and authentication. It should be possible to separate live ingest traffic to user accounts or channels.

Only authorized traffic sources shall be able to ingest video traffic into the ingest server.

The solution should be able to leverage the 3GPP QoS framework.

The solution should support different bitrates, depending on the available access network (like NR or LTE).

The solution shall support at least H.264 and HEVC video codecs.

The solution should be able to adapt the bitrate according to varying link conditions, e.g. mobility.

The solution should be able to either prioritize latency over quality/resulting bitrate (when a low latency live ingest is required) or quality/resulting bitrate over latency (when there is time for better compression efficiency or retransmissions).

The solution should support capability retrieval or capability negotiation.

5 Proposal

It is proposed to take the above given information into account. It is proposed to create a permanent document or a technical report to collect the solution design requirements and considerations (e.g. as given in the section 2, 3 and 4).

It is further proposed to include an HTTP based solution (as described in section 3.3) into the technical specification for the Live Uplink Video streaming framework.

The U.S. provisional application to which this application claims priority also included another appendix that contained a proposal for modifying a standard. The relevant portion of this other proposal (a.k.a., "contribution") is reproduced below.

1 Introduction

The revised framework for Live Uplink Streaming (FLUS) work item includes some bullets around guidelines, which are: (i) to describe relevant non-IMS-based user plane instantiations based on standardized technology and to describe how they can be bound through the FLUS Control API; (ii) how this uplink may be relayed into downlink services such as MTSI, PSS and MBMS; and (iii) any additional guidelines on the usage of FLUS.

This contribution provides a description around an fMP4 based F-U instantiation, which can be transported via today's HTTP 1.1 base infrastructure and also further HTTP2 and QUIC based infrastructures.

Note, the contribution distinguishes between the format used and the protocol.

The introduced format is based on ISO-BMFF segments, which contain one or a few samples such a video frame. The ISO-BMFF segment is called a FLUS chunk in this contribution. A FLUS chunk is very similar to a CMAF chunk (IEO/IEC 23000-19) with the following differences.

CMAF chunks are "addressable objects". "CMAF chunks are the smallest CMAF media object that can be encoded, and they can be referenced as addressable media objects." (Clause 7.3.2.3 in ISO/IEC 23000-19). In this FLUS instantiation, the FLUS chunk is typically sent as continuous stream using HTTP chunked delivery or HTTP2 streams, i.e. individual FLUS chunks are only implicitly addressable through in-sequence delivery.

CMAF defined codec constrains. This FLUS instantiation does not introduce codec constraints.

Note, that the 'styp' box in CMAF chunks is optional. The CMAF compatibility brand for CMAF Chunks ('cmfl') can only be provided with the 'styp' box. For FLUS chunks with HTTP 1.1 chunked delivery or with HTTP2 delivery, the 'styp' box is typically not present. Separation between format, protocol and configuration and example.

3 Proposal

It is proposed to add the following text into TR 26.939 ("Guidelines on the Framework for Live Uplink Streaming")

X. FLUS Media Instantiation for Fragmented MP4 with HTTP

X.1 Introduction

This section is only relevant when selecting a FLUS media instantiation of type "fMP4" (fragmented MP4).

ISO/IEC 14996-12 defines a generic media file format, which can be used for streamed media. It can be used for on-demand streaming and for live streaming. ISO/IEC 14996-12 can also be used as recording format, where a movie is recorded in a fragmented movie file (cf. Annex A.8 of ISO/IEC 14996-12).

When the FLUS media instantiation with fragmented MP4 is selected, the FLUS sink accepts a media stream, which are formatted as fragmented movie file according to ISO/IEC 14996-12 (e.g. Annex A.8). The FLUS source continuously creates and appends FLUS Chunks to a FLUS session.

A FLUS Chunk is an ISO-BMFF Segment as defined in ISO/IEC 14496-12 Clause 8.16. One or more media streams may be configured for the FLUS Session. HTTPS is used as streaming protocol.

A FLUS chunk is very similar to a CMAF chunk format (ISO/IEC 23000-19), except that it is not required to be directly addressable.

X.2 FLUS fMP4 Format

A FLUS fragment movie file starts with initialization information, i.e. a movie box ('moov'), followed by zero or more FLUS Chunks. A FLUS Chunk is a movie fragment box ('moor') with its associated media data and optionally other boxes. FLUS chunk may or may not contain Service Access Points. Typically, only a single codec sample is encapsulated in an FLUS chunk.

The initialization information ('moov') contains information around the number of tracks, the used codec, codec configuration and optionally static metadata for the upstreamed movie file. Note, media tracks like audio or video tracks, may be separated into independent movie files and logically associated through the FLUS session.

Figure 12:
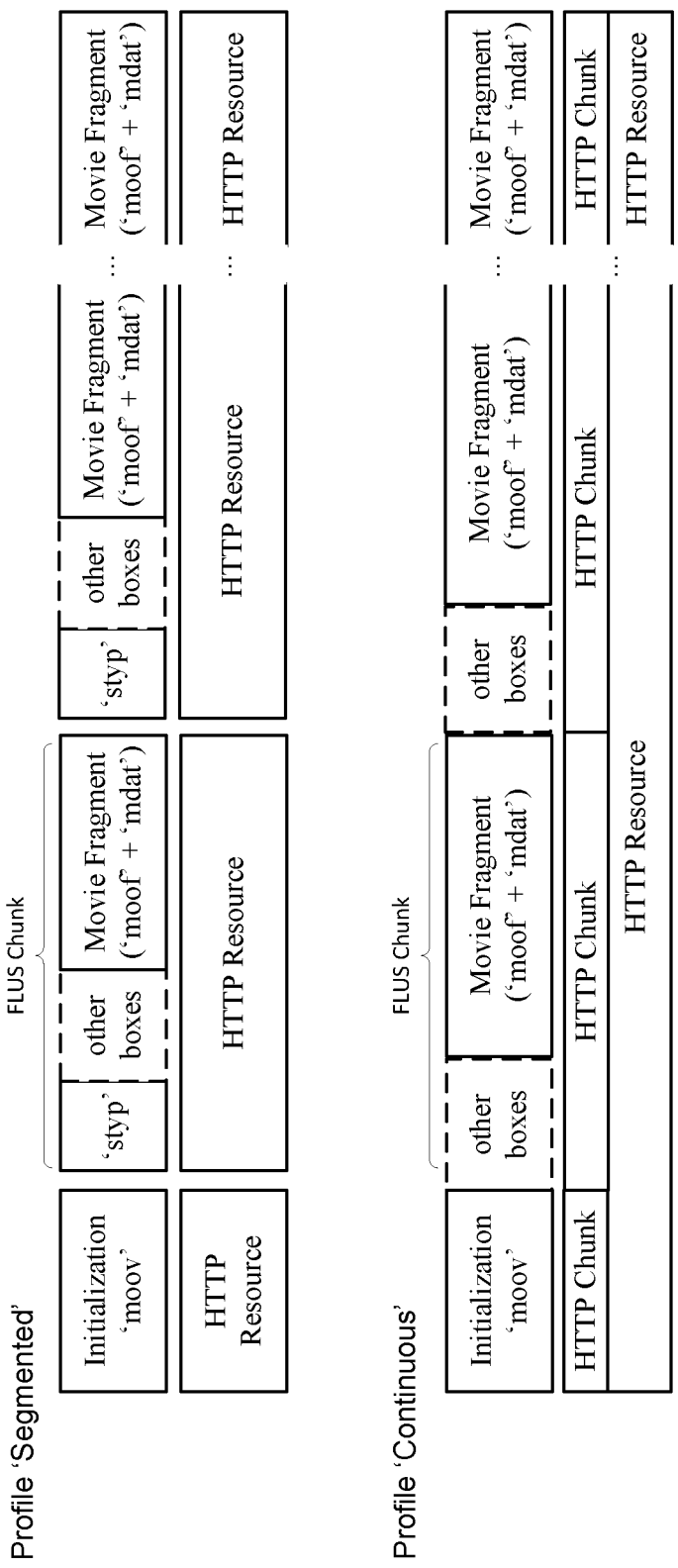
FIG. 12 illustrates segmented and continuous chunk profiles (with mapping to HTTP resources) according to some embodiments.

FIG. 12 illustrates segmented and continuous chunk profiles (with mapping to HTTP resources).

The fragmented MP4 FLUS media instantiation supports two format FLUS chunk profiles:

Segmented: The FLUS Chunks of the fragmented movie file are individual and addressable resources. Each FLUS Chunk starts with an 'styp' box, followed by other boxes.

Continuous: The FLUS Chunks of the fragmented movie file are continuously appended to a larger resource. FLUS chunks do not contain 'styp' boxes.

X.3 Usage of HTTP Protocol to Carry FLUS Media

The fragmented MP4 FLUS media instantiation focuses on the usage of the HTTP 1.1 and HTTP 2 protocol for uplink. Usage of secure connections is strongly recommended. Note, the 'Continuous' profile does not require HTTP and can be carried directly on TCP connection.

At FLUS session start, the FLUS Source provides first the initialization information for the movie file. After that, the FLUS Source provides a sequence of FLUS Chunks.

In case of HTTP 1.1, the FLUS Source uses HTTP chunked transfer encoding. This is indicated in the HTTP request header for the upload. The FLUS source finalizes the HTTP resource by sending a zero-size HTTP Chunk.

In case of HTTP2, the FLUS source is simply omitting the Content-Length header. The FLUS source finalizes the HTTP resource by closing the HTTP2 stream using the END_STREAM flag in a frame.

When using TCP as transport, the usage of a persistent TCP connection for HTTP resource up streaming is recommended. The TCP buffer level is controlled by means of the TCP_NOTSENT_LOWAT socket option that is available in multiple operating systems. An example of a recommended congestion control is LEDBAT [RFC6817], other congestion control schemes, which strive for a low network queue delay, are currently under development in IETF.

X.3 Rate Adaptation Considerations

The FLUS source may adapt the media bitrate to fit to the currently available link bitrate.

A media streaming solution is preferably rate adaptive in order to cope with changing network conditions. A FLUS source, creating an fMP4 stream, can also change the bitrate as needed.

In order to allow for rate adaptation, the FLUS sink should delay the stream for a configurable duration. The FLUS sink uses this reception queue (see FIG. 13) to recover the encoder frame rate, i.e. to compensate network jitter. The FLUS source needs to know or needs to provision this FLUS sink delay in order to apply rate adaptation techniques for example to provide the best possible quality at minimal frame losses (i.e. due to late FLUS Sink arrival).

Figure 13:
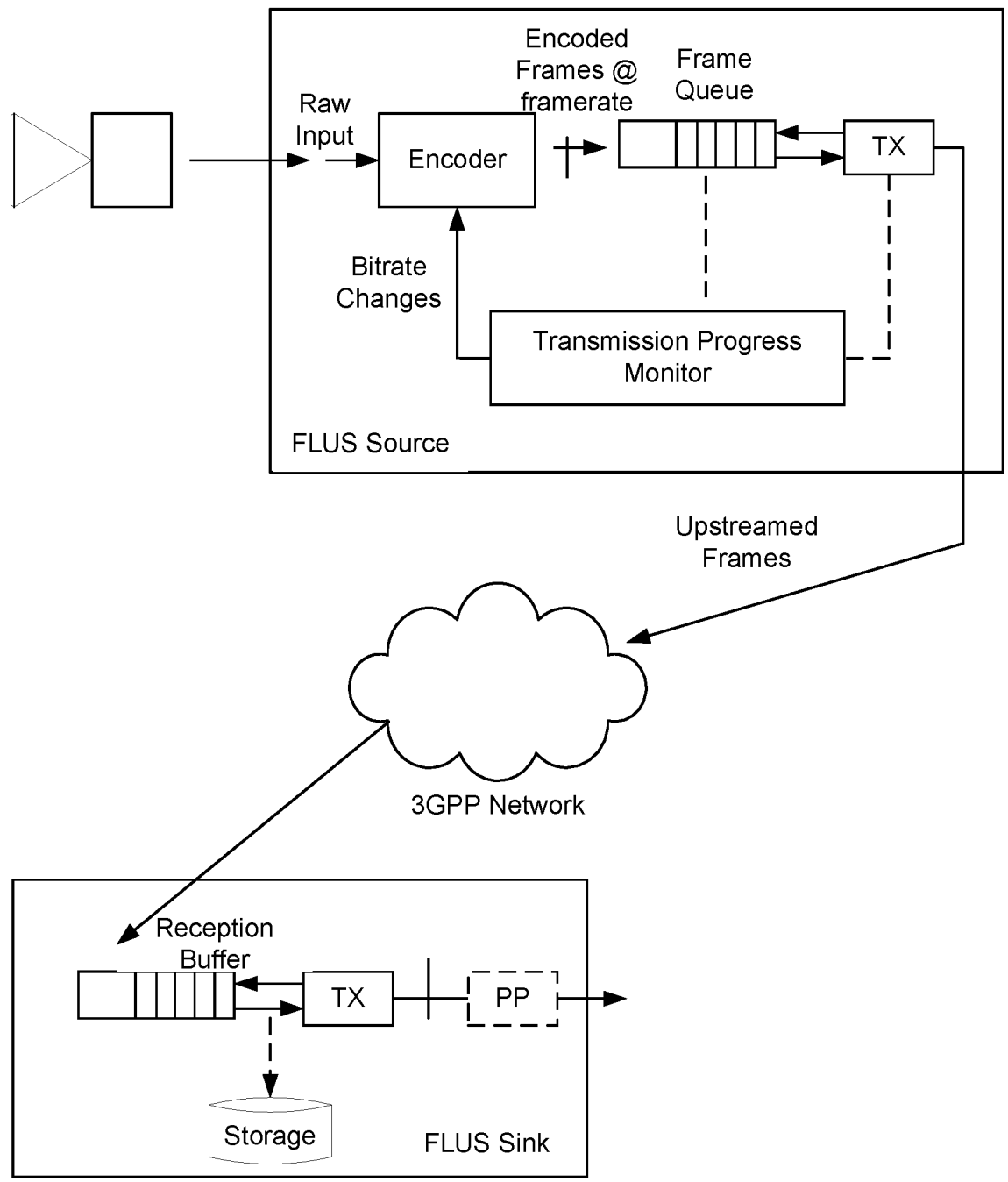
FIG. 13 illustrates rate adaptation according to some embodiments.

FIG. 13 illustrates rate adaptation.

A FLUS source can monitor the upstreaming progress. Existing transport protocols such as TCP employ a rate adaptation algorithm, which adjusts the TCP throughput to the available link bitrate. A rate adaptation logic can measure the bitrate at which the TCP sender is draining the frame queue. Further, the FLUS source can monitor, how quickly a frame is upstreaming (first byte of the frame until the last byte of the frame).

There is no need to standardize the detailed rate adaptation algorithm. However, the FLUS sink should support a reception queue and recovery of the encoder frame rate.

Other transport protocols such as QUIC may also be used to re-use rate control and retransmission schemes.

X.2.5 FLUS Sink Configuration

Editor's Note: The FLUS Sink may announce the supported HTTP version as part of the FLUS Sink capabilities.

Editor's Note: The FLUS sink may announce the existence of a reception queue for recovering the encoder frame rate (i.e. removing any network jitter).

Editor's Note: The binding between input media stream and processing and distribution configuration is ffs. For each incoming media stream, there should be a clear specification on the subsequent handling, e.g. transcoding or distribution URL handling.

TABLE X-1

| Property Name | Property Description | CI | CO | CI | GO | UI | UO | TI |
|---|---|---|---|---|---|---|---|---|
| Pipeline Description | The object contains a description of the forwarding behaviour of received media components to the processing and/or distribution sub-functions. The HTTPS URL or HTTPS base URL is used as identification of the media stream and the selection of the processing pipeline. When URLs are absolute URLs, then the URLs shall contain the Push URL value, as provided by the FLUS sink. When the URLs are relative URLs, then the URLS are relative to the Push URL, which is provided by the FLUS sink. When multiple media components are multiplexed into a single media stream, then the component type (e.g. audio or video) or the track id should be used as additional identifier. | | | | O | O | | |
| Profile | An enumerate for the upstreaming ingest profile. Valid values are: Segments, Chunks | | | | | | | |

| Type | Unit | Default |
|---|---|---|
| String | None | "Chunks" |

| | | | | | | | | |
|---|---|---|---|---|---|---|---|---|
| Push URL | A resource locator for ingesting media segment(s) using HTTPS via F-U. The FLUS source may create additional sub-resources using WebDAV procedures. This is a read-only property managed by the FLUS Sink and only present when "FLUS Media" is set to "fMP4. | | | | M | O | | |

| Type | Unit | Default |
|---|---|---|
| String | None | "" |

X.2.5 Example

An example from a wireshark capture is depicted below. The FLUS source uses here HTTP PUT together with HTTP chunked transfer encoding to an Apache2 server. The Apache2 server was configured with a webdav server module.

The first HTTP Chunk contains the 'ftyp' box and the initialization information. The first HTTP chunk is of size '27d'. The first FLUS chunk (containing here only 'moof' and 'mdat' boxes) is set afterwards as single HTTP chunk. The size of the second HTTP chunk is 2beb.

```
PUT /webdav/dbg-DirCam-20180119-092131.mp4 HTTP/1.1
Transfer-Encoding: chunked
Content-Type: video/avc
User-Agent: Ericsson Research
Host: 192.168.1.141
Connection: Keep-Alive
Accept-Encoding: gzip
Scheme: http
27d
....ftypisom....isomavc1...emoov...lmvhd......[
..[
.................................................@..............................
...............trak...\tkhd......[
..[
.............................................................@.........................em
dia... mdhd......[
..[
........U......%hdlr........vide.........Tlos.....minf....vmhd..........................
...$dinf....dref...........url
............stbl....stsd...........|avc1....................................H...H..................
....................................&avcC.B.(....gB.(..@x.
...E8...h.C.....stts............stsc.............stsz.........................stco...............
......(mvex... trex........................
2beb
...Pmoof....mfhd............8traf....tfhd...8........d..+....@....trun..................
..X..+.mdat..+.e....@...&(....}.....O..
3..;.}.........]..}.........}..}.....?.G.W.Q......'..x....>
<cut>
..Dns.@#.v'......8..L#......{..G......?."8@F.....4F...B.B.'....7.#.C..8.<p....
.8...D.0G...a.LG.#.x..>.>...x`C.^...?8....?.P....
..<.
mN#.......O?V..%..:.,#....q.z...V.b....U....7.%hK.xpC..."......x....|Gb;..7
..ui..@..0Gb..#t!..w....Y..;..z..@!a..]Z...8LF.
0
```

```
HTTP/1.1 201 Created
Date: Fri, 19 Jan 2018 08:21:42 GMT
Server: Apache/2.4.18 (Ubuntu)
Location: http://192.168.1.141/webdav/dbg-DirCam-20180119-
092131.mp4
Access-Control-Allow-Origin: *
Content-Length: 291
Keep-Alive: timeout=5, max=100
Connection: Keep-Alive
Content-Type: text/html; charset=ISO-8859-1
<!DOCTYPE HTML PUBLIC "-//IETF//DTD HTML 2.0//EN">
<html><head>
<title>201 Created</title>
</head><body>
<h1>Created</h1>
<p>Resource /webdav/dbg-DirCam-20180119-092131.mp4 has been
created.</p>
<hr />
<address>Apache/2.4.18 (Ubuntu) Server at 192.168.1.141 Port 80
</address>
</body></html>
```

When the FLUS source terminates the HTTP Request body using a zero size HTTP chunk, the HTTP server provides the HTTP response.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a client apparatus ("client") for upstreaming to a server a live media feed produced by a media source, the method comprising:

the client establishing a transport layer connection with the server;

the client transmitting to the server over the transport layer connection a Hypertext Transfer Protocol (HTTP) message comprising a header and a body, wherein the header of the HTTP message does not indicate the size of the body of the HTTP message;

the client storing in a transmit buffer media data corresponding to the live media feed as the media data is generated, wherein an encoding bitrate setting is used to generate the media data, wherein transmitting the body of the first message to the server over the transport layer connection comprises:

1) before transmitting any media data corresponding to the live media feed, the client transmitting to the server over the transport layer connection a movie box comprising information identifying a used codec and codec configuration information;

2) after transmitting the movie box, transmitting one or more Common Media Application Format (CMAF) Chunks, wherein each CMAF chunk comprises media data corresponding to the live media feed; and 3) after transmitting the one or more CMAF Chunks, transmitting i) an HTTP frame comprising an End_Stream flag or ii) a zero-size HTTP Chunk.

2. The method of claim 1, further comprising:

after transmitting the movie box and before transmitting the HTTP frame or the zero-size HTTP Chunk, the client adapting a media bit rate to fit a currently available link bitrate.

3. The method of claim 2, wherein adapting the media bit rate comprises changing the encoding bitrate.

4. The method of claim 1, wherein the transport layer connection includes a TCP connection.

5. The method of claim 1, wherein the HTTP message is transmitted over the transport layer connection utilizing an HTTP 1.1 Protocol.

6. The method of claim 1, wherein the HTTP message is transmitted over the transport layer connection utilizing an HTTP 2 Protocol.

7. The method of claim 1, wherein the HTTP message is transmitted over the transport layer connection directly, without utilizing an HTTP Protocol.

8. The method of claim 1, wherein the media source is a camera.

9. The method of claim 8, wherein the camera is an integral part of the client.

10. The method of claim 8, wherein the camera is remote from the client.

11. The method of claim 1, wherein the method further comprises the client repeating steps (1), (2) and (3) until a cease transmission trigger is detected, the cease transmission trigger is based on a schedule specifying a time duration, and the client detects the cease transmission trigger as a result of detecting that the time duration has elapsed.

12. The method of claim 1, further comprising:

the client using a first bitrate setting to encode a first set of media frames generated by the media source to produce a first set of encoded media frames, wherein the media data stored in the transmit buffer comprises the first set of encoded media frames;

the client monitoring the amount of data stored in the transmit buffer;

the client determining that the amount of data stored in the transmit buffer exceeds a threshold;

as a result of determining that the amount of data stored in the transmit buffer exceeds the threshold, the client using a second bitrate setting to encode a second set of media frames generated by the media source to produce a second set of encoded media frames;

the client storing in the transmit buffer further media data corresponding to the live media feed, wherein the further media data comprises the second set of encoded media frames.

13. The method of claim 1, further comprising:

the client encoding a first set of media frames generated by the media source to produce a first set of encoded media frames, wherein the media data stored in the transmit buffer comprises the first set of encoded media frames;

the client monitoring the amount of data stored in the transmit buffer;

the client determining that the amount of data stored in the transmit buffer exceeds a threshold;

as a result of determining that the amount of data stored in the transmit buffer exceeds the threshold, the client dropping from the transmit buffer at least a subset of the first set of media frames such that the dropped frames are not transmitted to the server.

14. The method of claim 13, wherein
said transmit buffer stores a media fragment comprising said subset of the first set of media frames and further comprising meta data regarding the subset of media frames, and
the step of dropping from the transmit buffer said subset of the first set of media frames comprises dropping the media fragment from the transmit buffer such that the media fragment is not transmitted to the server.

15. The method of claim 1, further comprising:
the client obtaining uncompressed video frames generated by the media source;
the client encoding the uncompressed video frames to produce encoded video frames;
the client generating a video fragment comprising: i) the encoded video frames and ii) meta-data pertaining to the encoded video frames; and
the client storing the fragment in the transmit buffer.

16. The method of claim 15, wherein the video fragment is one of: i) an ISO-BMFF video fragment and ii) a Common Media Application Format (CMAF) video fragment.

17. The method of claim 1, wherein the live feed can be further processed by a receiving entity for live distribution.

18. The method of claim 1, wherein the client transmitting to the server over the transport layer at least a portion of the media data currently stored in the transmit buffer comprises transmitting a data chunk comprising at least a portion of the media data currently stored in the transmit buffer.

19. The method of claim 1, wherein said determining whether the client should modify the bitrate setting that is used to generate the media data corresponding to the live media feed is based on transmit buffer level and/or changes in the transmit buffer level over time.

20. A method performed by a server for receiving from a client a live media feed produced by a media source, the method comprising:
receiving over a transport layer connection with the client, a header for a HTTP message comprising a body, wherein the header does not indicate the size of the body of the HTTP message;
after receiving the header of the HTTP message, receiving the body of the HTTP message, wherein receiving the body of the HTTP message comprises:
1) receiving a movie box comprising information identifying a used codec and codec configuration information;
2) after receiving the movie box, receiving one or more Common Media Application Format (CMAF) Chunks, wherein each CMAF chunk comprises media data corresponding to the live media feed; and
3) after receiving the one or more CMAF chunks, receiving a) an HTTP frame comprising an End_Stream flag or b) a zero-size HTTP Chunk.

21. A client for upstreaming to a server a live media (audio and/or video) feed produced by a media source, the client comprising:

a receiver;
a transmitter;
a data storage system; and
a data processing apparatus comprising a processor, wherein the data processing apparatus is coupled to the data storage system, the transmitter, and the receiver, and the data processing apparatus is configured to:
establish a transport layer connection with the server;
transmit to the server over the transport layer connection a HTTP message comprising a header and a body, wherein the header of the HTTP message does not indicate the size of the body of the HTTP message;
store in a transmit buffer media data corresponding to the live media feed as the media data is generated, wherein a bitrate setting is used to generate the media data, wherein transmitting the body of the HTTP message to the server over the transport layer connection comprises:
1) before transmitting any media data corresponding to the live media feed, transmit to the server over the transport layer connection a movie box comprising information identifying a used codec and codec configuration information;
2) after transmitting the movie box, transmit one or more Common Media Application Format (CMAF) Chunks, wherein each CMAF chunk comprises media data corresponding to the live media feed; and
3) after transmitting the one or more CMAF Chunks, transmit either i) an HTTP frame comprising an End_Stream flag or ii) a zero-size HTTP Chunk.

22. A server for receiving from a client a live media (audio and/or video) feed produced by a media source, the server comprising:
a receiver;
a transmitter;
a data storage system; and
a data processing apparatus comprising a processor, wherein the data processing apparatus is coupled to the data storage system, the transmitter, and the receiver, and the data processing apparatus is configured to:
receive over a transport layer connection with the client, a header for a HTTP message comprising a body, wherein the header does not indicate the size of the body of the HTTP message;
after receiving the header, receive the body of the HTTP message, wherein receiving the body of the HTTP message comprises:
1) receiving a movie box comprising information identifying a used codec and codec configuration information;
2) after receiving the movie box, receiving one or more Common Media Application Format (CMAF) Chunks, wherein each CMAF chunk comprises media data corresponding to the live media feed; and
3) after receiving the one or more CMAF chunks, receiving a) an HTTP frame comprising an End_Stream flag or b) a zero-size HTTP Chunk.

* * * * *

UNITED STATES PATENT AND TRADEMARK OFFICE
CERTIFICATE OF CORRECTION

PATENT NO. : 10,904,313 B2
APPLICATION NO. : 16/217586
DATED : January 26, 2021
INVENTOR(S) : Lohmar et al.

It is certified that error appears in the above-identified patent and that said Letters Patent is hereby corrected as shown below:

On the Title Page

Item (57), under "ABSTRACT", in Column 2, Line 15, delete "data," and insert -- data; --, therefor.

On Page 2, item (56), under "OTHER PUBLICATIONS", in Column 2, Lines 4-5, delete "Internet," in IEEE on Multimedia, vol. 6, No. 4, pp. 634-646, Aug. 2004. Transactions." and insert -- Internet," in IEEE Transactions on Multimedia, vol. 6, No. 4, pp. 634-646, Aug. 2004. --, therefor.

In the Drawings

In Fig. 6, Sheet 6 of 13, in Sep "612", Line 4, delete "feed, and" and insert -- feed; and --, therefor.

In the Specification

In Column 3, Line 27, delete "feed, and" and insert -- feed; and --, therefor.

In Column 5, Line 15, delete "feed, and" and insert -- feed; and --, therefor.

In Column 5, Line 42, delete "feed, and" and insert -- feed; and --, therefor.

In Column 6, Line 3, delete "feed, and" and insert -- feed; and --, therefor.

In Column 15, Line 19, delete "feed, and" and insert -- feed; and --, therefor.

In Column 17, Line 66, delete "boxe." and insert -- boxes. --, therefor.

In Column 21, Line 45, delete "Base Based" and insert -- Based --, therefor.

Signed and Sealed this
Fourth Day of January, 2022

Drew Hirshfeld
*Performing the Functions and Duties of the
Under Secretary of Commerce for Intellectual Property and
Director of the United States Patent and Trademark Office*

In Column 25, Line 39, delete "('moor')" and insert -- ('moof') --, therefor.

In the Claims

In Column 30, Line 33, in Claim 11, delete "the" and insert the same at Line 34 before "Client".